US009161367B2

(12) United States Patent
Miki et al.

(10) Patent No.: US 9,161,367 B2
(45) Date of Patent: Oct. 13, 2015

(54) RADIO COMMUNICATION SYSTEM, BASE STATION, USER TERMINAL, AND COMMUNICATION CONTROL METHOD

(71) Applicant: NTT DOCOMO, INC., Chiyoda-ku (JP)

(72) Inventors: Nobuhiko Miki, Chiyoda-ku (JP); Moo Ryong Jeong, Palo Alto, CA (US)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/358,170

(22) PCT Filed: Dec. 6, 2012

(86) PCT No.: PCT/JP2012/081641
§ 371 (c)(1),
(2) Date: May 14, 2014

(87) PCT Pub. No.: WO2013/084991
PCT Pub. Date: Jun. 13, 2013

(65) Prior Publication Data
US 2014/0302868 A1 Oct. 9, 2014

(30) Foreign Application Priority Data

Dec. 7, 2011 (JP) ................................. 2011-267580

(51) Int. Cl.
H04W 72/00 (2009.01)
H04W 72/08 (2009.01)
H04L 5/00 (2006.01)

(52) U.S. Cl.
CPC ............. *H04W 72/085* (2013.01); *H04L 5/006* (2013.01); *H04W 72/087* (2013.01)

(58) Field of Classification Search
CPC ... H04W 72/085; H04W 72/087; H04L 5/006
See application file for complete search history.

(56) References Cited

U.S. PATENT DOCUMENTS

2011/0194520 A1* 8/2011 Akimoto et al. .............. 370/329
2011/0249643 A1 10/2011 Barbieri et al.
2012/0094650 A1* 4/2012 Lei et al. ..................... 455/422.1
2013/0235756 A1* 9/2013 Seo et al. ...................... 370/252

FOREIGN PATENT DOCUMENTS

JP 2008-48319 2/2008

OTHER PUBLICATIONS

Japanese Office Action issued Jul. 8, 2014, in Japan Patent Application No. 2011-267580 (with English translation).

(Continued)

Primary Examiner — Wayne Cai
(74) Attorney, Agent, or Firm — Oblon, McClelland, Maier & Neustadt, L.L.P.

(57) ABSTRACT

A user terminal reports a group radio quality of each of radio resource groups to a base station at a first frequence. The base station reports an allocated radio resource group to be allocated for radio communication with the user terminal to the user terminal. The user terminal reports unit radio qualities of radio resource units contained in the allocated radio resource group to the base station at a second frequence that is higher than the first frequence. The base station performs radio resource scheduling on the basis of the unit radio qualities.

7 Claims, 14 Drawing Sheets

(56) References Cited

OTHER PUBLICATIONS

International Search Report issued Jan. 8, 2013, in PCT/JP12/081641 filed Dec. 6, 2012.
"Discussion on CRS interference and CSI measurements in macro-pico deployment", ZTE, 3GPP TSG RAN WG1 Meeting #63, R1-105969, Nov. 15-19, 2010, 4 pages.
"Remaining issues on eICIC for Rel-10", NTT DOCOMO, 3GPP TSG RAN WG1 Meeting #63, R1-106184, Nov. 15-19, 2010, 6 pages.
Extended European Search Report issued Aug. 7, 2015 in Patent Application No. 12855318.7.
"Performance of CRE and resource specific CSI" LG Electronics: 3GPP TSG RAN WG1 Meeting #63 R1-106145, Nov. 15-19, 2010, 5 pages.

* cited by examiner

RADIO COMMUNICATION SYSTEM, BASE STATION, USER TERMINAL, AND COMMUNICATION CONTROL METHOD

TECHNICAL FIELD

The present invention relates to radio communication systems, base stations, user terminals, and communication control methods.

BACKGROUND ART

Technologies to allocate radio resources on the basis of measured qualities of radio resources have been known (e.g., radio connection destination selecting and frequency scheduling). However, receiving qualities are not uniform over all radio resources; for instance, receiving qualities could change in every time period or with respect to each frequency. Thus, a technology in which a radio quality of each radio resource unit (e.g., if a radio resource is a predetermined frequency band, then a partial frequency band contained in the frequency band is a radio resource unit) contained in radio resources is measured and reported to a base station by a user terminal has been suggested (e.g., Patent Document 1).

CITATION LIST

Patent Document

Patent Document 1: Japanese Patent Application Publication No. 2008-048319

SUMMARY OF INVENTION

Technical Problem

In a technology in which a user terminal measures and reports receiving qualities to a base station for many radio resource units, overhead for the reporting is likely to become too high. On the other hand, if receiving qualities are not reported to the base station for many radio resource units, radio resources are not scheduled appropriately and throughput of a radio communication system is likely to decrease.

In light of the situation above, an object of the present invention is, in a radio communication system in which radio resource groups (wideband, etc.) are used for communication and each of the radio resource groups contains radio resource units (subbands, etc.), to perform appropriate reporting (feedback) of receiving qualities of radio resources by a user terminal, to maintain throughput of the radio communication system, and to reduce overhead for reporting.

Solution to Problem

A radio communication system according to the present invention includes a user terminal and a base station capable of communicating wirelessly with the user terminal by using at least one of the radio resource groups, each of which contains radio resource units. The user terminal includes a first quality measuring unit adapted to measure the radio resource groups for their respective group radio qualities; and a first quality reporting unit adapted to report the group radio qualities measured by the first quality measuring unit to the base station at a first frequence. The base station includes an allocated resource group determining unit adapted to determine at least one of the radio resource groups as an allocated radio resource group to be allocated for radio communication with the user terminal on the basis of the group radio qualities reported by the first quality reporting unit of the user terminal; and an allocated resource group signaling unit adapted to report, to the user terminal, the at least one allocated radio resource group determined by the allocated resource group determining unit and to be allocated for radio communication with the base station. The user terminal further includes a second quality measuring unit adapted to measure a unit radio quality of at least one radio resource unit contained in the at least one allocated radio resource group reported by the allocated resource group signaling unit of the base station; and a second quality reporting unit adapted to report the at least one unit radio quality measured by the second quality measuring unit to the base station at a second frequence, the second frequence being higher than the first frequence. The base station further includes a scheduling unit adapted to schedule a radio resource to be allocated for radio communication between the base station and the user terminal on the basis of the at least one unit radio quality reported by the second quality reporting unit of the user terminal.

In the configuration described above, a radio resource group is first allocated to a user terminal wirelessly connected to a base station on the basis of a group radio quality reported to the base station by the user terminal. Subsequently, a unit radio quality of a radio resource unit in the allocated radio resource group is reported. A group radio quality is reported in a longer cycle (less frequently) than a unit radio quality. Thus, compared to a configuration in which a unit radio quality is reported for every radio resource group, overhead for reporting (feedback) from a user terminal can be reduced. Moreover, since a more appropriate radio resource is selected first, throughput of the radio communication system can be maintained.

According to a preferred embodiment of the present invention, the radio communication system includes the base stations. The base stations include a first base station and a second base station that has a lower radio transmission capacity than the first base station. The user terminal is capable of communicating wirelessly with either or both of the first base station and the second base station. The radio resource groups are protected resources and non-protected resources, the protected resources being the radio resource groups on which the second base station transmits radio signals and the non-protected resources being the radio resource groups on which both the first base station and the second base station transmit radio signals. The first quality measuring unit of the user terminal measures the receiving qualities of all frequency bands of each of the protected resources and the non-protected resources as group radio qualities. The allocated resource group determining unit of the base station determines either or both of the protected resources and the non-protected resources as the allocated radio resource groups to be used for radio communication with the base station according to the receiving qualities of the protected resources and the receiving qualities of the non-protected resources. The second quality measuring unit of the user terminal measures, as the unit radio qualities, the receiving quality of at least one partial frequency band contained in all frequency bands in either or both of the protected resources and the non-protected resources determined by the allocated resource group determining unit. In the protected resources, the first base station may stop transmitting radio signals (i.e., only the second base station transmits radio signals); or the first base station may transmit radio signals with lower transmission power than in the non-protected resources.

In the configuration described above, since a user terminal needs to report receiving qualities of partial frequency bands in either the protected resources or the non-protected resources only, compared to a configuration in which receiving qualities are measured and reported for partial frequency bands in both the protected resources and the non-protected resources, overhead for reporting (feedback) can be reduced. Moreover, since the more appropriate radio resources are selected from the protected resources or the non-protected resource, throughput of the radio communication system can be maintained.

According to a preferred embodiment of the present invention, the radio communication system includes the user terminals, and the allocated resource group determining unit of the second base station determines, for each of the user terminals, either or both of the protected resources and the non-protected resources as the allocated radio resource groups to be used for radio communication between the second base station and each of the user terminals according to distribution of a differentiation factor calculated for each of the user terminals. The differentiation factor is calculated on the basis of the ratio of the receiving quality of the protected resource and the receiving quality of the non-protected resource, the receiving quality of the protected resource and the receiving quality of the non-protected resource having been reported by each of the user terminals wirelessly connected to the second base station.

In the configuration described above, since user terminals are first classified on the basis of distribution of differentiation factors and then radio resource groups are allocated to each of the user terminals, compared to a configuration in which radio resource groups are allocated to user terminals individually, radio resource groups are allocated more appropriately. Thus, throughput of the overall radio communication system can be improved.

According to a preferred embodiment of the present invention, the base station further includes: a bias value setting unit adapted to set a bias value for the user terminal; a bias value signaling unit adapted to report the bias value to the user terminal; and a destination selecting unit adapted to select a base station to which the user terminal is to connect wirelessly. The user terminal further includes: a received power measuring unit adapted to measure received power of radio signals received from the first base station to obtain a first received power value and to measure received power of radio signals received from the second base station to obtain a second received power value; a received power adjusting unit adapted to adjust the second received power value upward by using the bias value reported by the bias value signaling unit of the base station; and a received power signaling unit adapted to report the first received power value obtained by the received power measuring unit and the second received power value adjusted by the received power adjusting unit to the destination selecting unit of the base station. The destination selecting unit of the base station selects the base station corresponding to the received power value that is the greater of the first received power value and the adjusted second received power value reported by the received power signaling unit of the user terminal. The allocation resource group determining unit of the second base station, among the user terminals wirelessly connected to the second base station, with respect to the user terminals for which the second received power values, before adjustment with the bias values, are higher than the first received power values, calculates the differentiation factors on the basis of the ratios of the receiving qualities of the protected resources and the receiving qualities of the non-protected resources reported by the user terminals, and with respect to the user terminals for which the second received power values, before adjustment with the bias values, are lower than the first received power values, sets a predetermined value as the differentiation factor.

In the configuration described above, group radio qualities do not need to be reported for the radio resource group allocation for user terminals connected to the second base station by the adjustment with the bias value. Thus, overhead for reporting (feedback) from the user terminals connected to the second base station by the adjustment with the bias value can be reduced.

A base station according to the present invention is capable of communicating wirelessly with a user terminal by using at least one of radio resource groups, each of which contains radio resource units. The base station includes: an allocated resource group determining unit adapted to determine at least one of the radio resource groups as an allocated radio resource group to be allocated for radio communication with the user terminal on the basis of group radio qualities that correspond to each of the radio resource groups and are reported by the user terminal at a first frequence; an allocated resource group signaling unit adapted to report, to the user terminal, the at least one allocated radio resource group determined by the allocated resource group determining unit and to be allocated for radio communication with the base station; and a scheduling unit adapted to schedule a radio resource to be allocated for radio communication with the user terminal on the basis of at least one unit radio quality that corresponds to at least one radio resource unit contained in the at least one allocated radio resource group and is reported by the user terminal at a second frequence, the second frequence being higher than the first frequence.

A user terminal according to the present invention is capable of communicating wirelessly with a base station by using at least one of the radio resource groups, each of which contains radio resource units. The user terminal includes: a first quality measuring unit adapted to measure the radio resource groups for their respective group radio qualities; a first quality reporting unit adapted to report the group radio qualities measured by the first quality measuring unit to the base station at a first frequence; a second quality measuring unit adapted to measure a unit radio quality of at least one radio resource unit contained in the at least one allocated radio resource group that has been determined on the basis of the group radio qualities and been reported to the user terminal by the base station and are to be allocated for radio communication with the base station; a second quality reporting unit adapted to report the at least one unit radio quality measured by the second quality measuring unit to the base station at a second frequence, the second frequence being higher than the first frequence; and a data demodulating unit adapted to demodulate data signals transmitted by the base station according to radio resource scheduling that has been performed on the basis of the at least one unit radio quality.

A communication control method according to the present invention is a communication control method for a radio communication system including: a user terminal and a base station capable of communicating wirelessly with the user terminal by using at least one of the radio resource groups, each of which contains radio resource units. The communication control method includes: in the user terminal, measuring the radio resource groups for their respective group radio qualities, and reporting the measured group radio qualities to the base station at a first frequence; in the base station, determining at least one of the radio resource groups as an allocated radio resource group to be allocated for radio communication with the user terminal on the basis of the group radio qualities reported by the user terminal and reporting the at least one allocated radio resource group to be allocated for radio communication with the base station to the user terminal; in the user terminal, measuring a unit radio quality of at least one radio resource unit contained in the at least one allocated radio resource group reported by the base station and reporting the at least one measured unit radio quality to the base station at a second frequence, the second frequence being higher than the first frequence; and in the base station, scheduling a radio resource to be allocated for radio communication between the base station and the user terminal on the basis of the at least one unit radio quality reported by the user terminal.

DESCRIPTION OF EMBODIMENTS

First Embodiment (1) Overview of Radio Communication System

Figure 1:
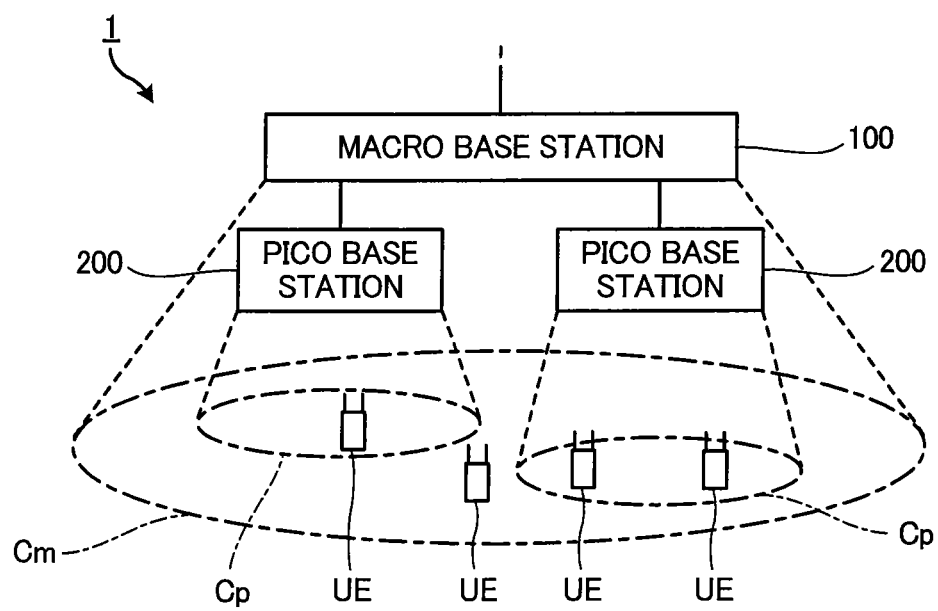
FIG. 1 is a block diagram showing a radio communication system according to a first embodiment of the present invention.

FIG. 1 is a block diagram illustrating a radio communication system 1 according to an embodiment of the present invention. The radio communication system 1 includes a macro base station (macro eNodeB (evolved Node B)) 100, a pico base station (pico eNodeB) 200, and a user terminal (user equipment) UE. Although the single macro base station 100 is shown in the figure for simplicity, it would naturally be understood that the radio communication system 1 could include multiple macro base stations 100.

Radio communication between each communication component (the macro base station 100, the pico base station 200, the user terminal UE, etc.) in the radio communication system 1 is performed according to a predetermined Radio Access Technology, such as LTE (Long Term Evolution). Although the present embodiment describes an example in which the radio communication system 1 operates according to LTE, it is not intended to limit the technical scope of the present invention. It would naturally be understood that the present invention could be applied to other Radio Access Technologies (for instance, WiMAX as specified by IEEE 802.16-2004 and IEEE 802.16e) with necessary design modifications.

The macro base station 100 and the pico base station 200 are connected to each other by wired or wireless connection. The macro base station 100 forms a macrocell Cm, and the pico base station 200 forms a picocell Cp. The picocell Cp can be formed in the macrocell Cm formed by the macro base station 100 that connects to the pico base station 200 that forms the picocell Cp. The single macrocell Cm can have a plurality of the picocells Cp.

The base stations (the macro base station 100, the pico base station 200) are able to communicate wirelessly with the user terminal UE present in the respective cells formed by the base stations (Cm, Cp). In other words, the user terminal UE is able to communicate wirelessly with a base station (the macro base station 100, the pico base station 200) corresponding to the cell (the macrocell Cm, the picocell Cp) to which the user terminal itself belongs.

Considering that the picocell Cp is formed in the macrocell Cm in a multi-layered manner (the picocell Cp and the macrocell Cm are overlaid), it can be understood that in a situation in which the user terminal UE is present in the picocell Cp, the user terminal UE is able to communicate wirelessly with either or both of the pico base station 200 forming the picocell Cp and the macro base station 100 forming the macrocell Cm that contains the picocell Cp.

A scheme of radio data transmission between each of the base stations and the user terminal UE can be chosen freely. For instance, OFDMA (Orthogonal Frequency Division Multiple Access) can be used for the downlink, and SC-FDMA (Single-Carrier Frequency Division Multiple Access) can be used for the uplink.

(2) Configuration of the User Terminal UE

Figure 2:
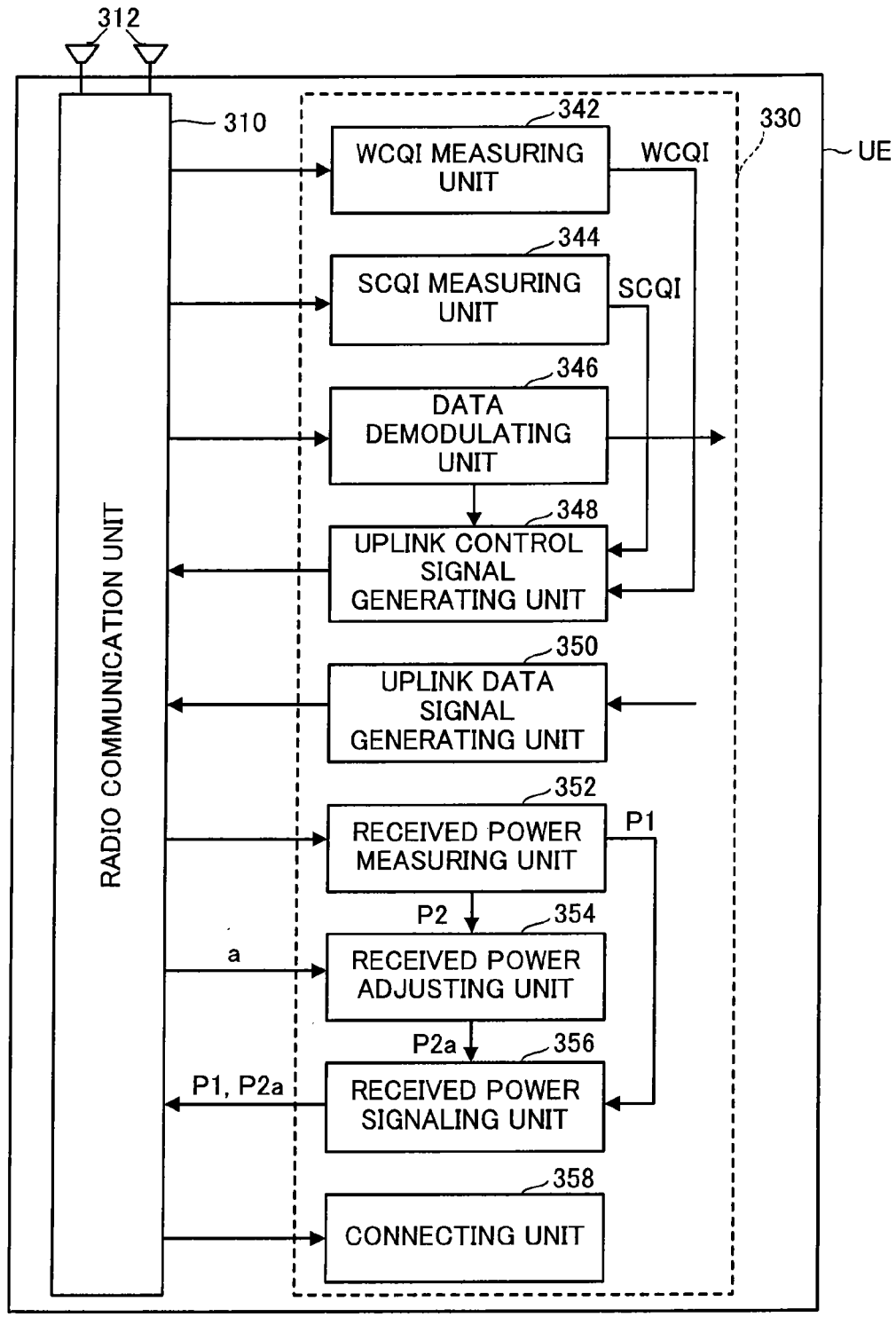
FIG. 2 is a block diagram showing a configuration of a user terminal in the first embodiment of the present invention.

FIG. 2 is a block diagram illustrating a configuration of the user terminal UE according to the embodiment of the present invention. The user terminal UE includes a radio communication unit 310 and a control unit 330. An output device for outputting voice and video and an input device for receiving instructions from a user are omitted in the figure for convenience.

The radio communication unit 310, a component for communicating wirelessly with the base stations (the macro base station 100, the pico base station 200), includes a transceiver antenna 312, a receiving circuit for receiving radio waves from the base stations and converting the radio waves to electrical signals, a signal separating unit for separating the converted electrical signals into data signals and control signals, a signal multiplexing unit for multiplexing the data signals and the control signals provided by the control unit 330, and a transmitting circuit for converting the multiplexed electrical signals into radio waves and transmitting the converted radio waves.

The control unit 330, as its components, includes a wideband channel quality indicator (WCQI) measuring unit 342, a subband channel quality indicator (SCQI) measuring unit 344, a data demodulating unit 346, an uplink control signal generating unit 348, an uplink data signal generating unit 350, a received power measuring unit 352, a received power adjusting unit 354, a received power signaling unit 356, and a connecting unit 358. The WCQI, the SCQI, and operations of the control unit 330 are described later in detail.

The control unit 330 and the components included in the control unit 330, the WCQI measuring unit 342, the SCQI measuring unit 344, the data demodulating unit 346, the uplink control signal generating unit 348, the uplink data signal generating unit 350, the received power measuring unit 352, the received power adjusting unit 354, the received power signaling unit 356, and the connecting unit 358, are a functional block performed by a central processing unit (CPU), which is in the user terminal UE and is not shown in the figure, executing a computer program and functioning according to the computer program, the computer program being stored in a memory that is not shown in the figure.

(3) Configuration of the Macro Base Station 100

Figure 3:
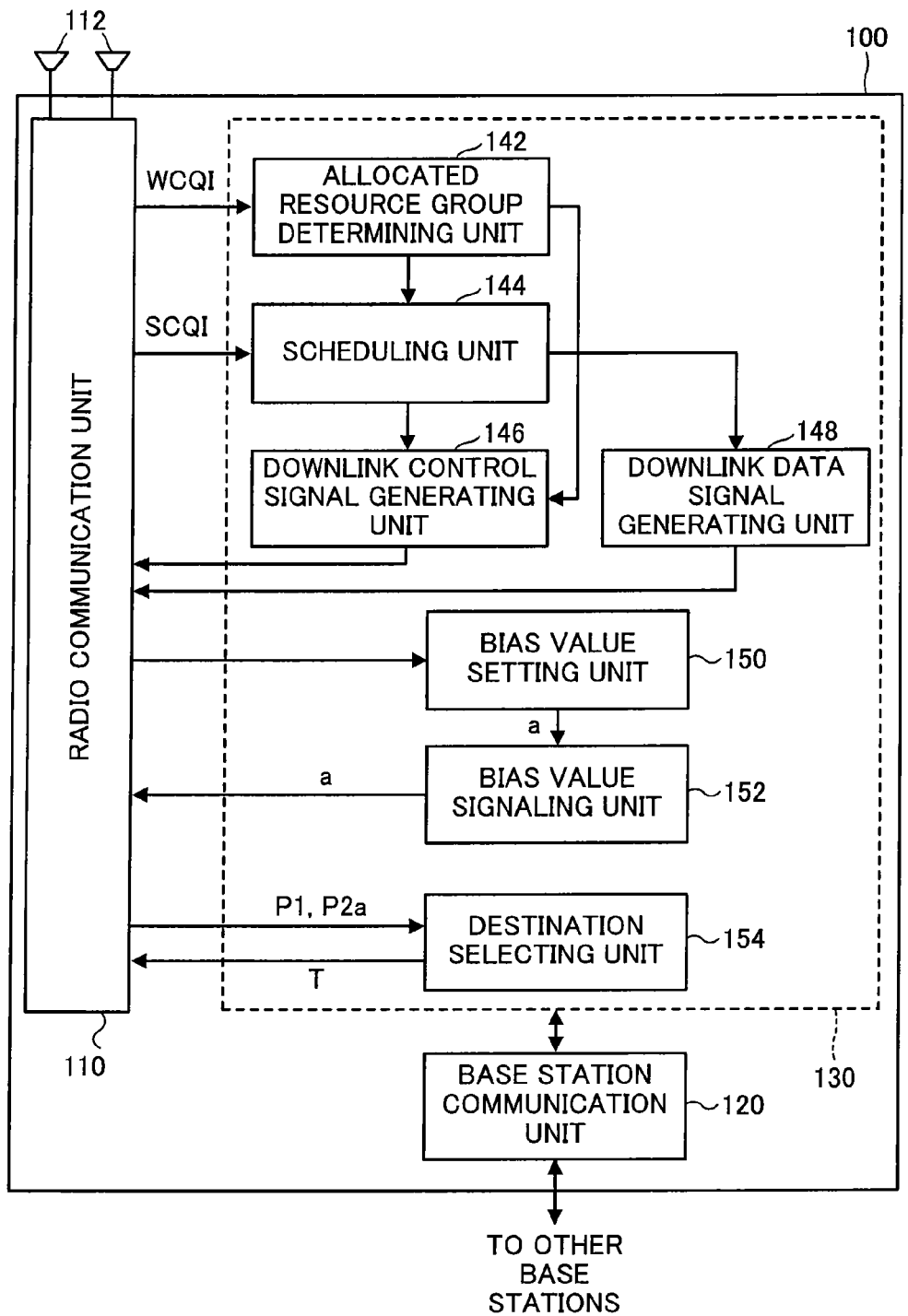
FIG. 3 is a block diagram showing a configuration of a macro base station in the first embodiment of the present invention.

FIG. 3 is a block diagram illustrating a configuration of the macro base station 100 according to the embodiment of the present invention. The macro base station 100 includes a radio communication unit 110, a base station communication unit 120, and a control unit 130.

The radio communication unit 110, a component for communicating wirelessly with the user terminal UE, includes a transceiver antenna 112, a receiving circuit for receiving radio waves from the user terminal UE and converting the radio waves to electrical signals, a signal separating unit for separating the converted electrical signals into data signals and control signals, a signal multiplexing unit for multiplexing the data signals and the control signals provided by the control unit 130, and a transmitting circuit for converting the multiplexed electrical signals to radio waves and transmitting the converted radio waves.

The base station communication unit 120, a component for communicating with other base stations (another of the macro base station 100, the pico base station 200), transmits and receives electrical signals to and from the other base stations via wired or wireless connection.

The control unit 130, as its components, includes an allocated resource group determining unit 142, a scheduling unit 144, a downlink control signal generating unit 146, a downlink data signal generating unit 148, a bias value setting unit 150, a bias value signaling unit 152, and a destination selecting unit 154. Operations of the control unit 130 are described later in detail.

The control unit 130 and the components included in the control unit 130, the allocated resource group determining unit 142, the scheduling unit 144, the downlink control signal generating unit 146, the downlink data signal generating unit 148, the bias value setting unit 150, the bias value signaling unit 152, and the destination selecting unit 154, are a functional block performed by a central processing unit (CPU), which is in the macro base station 100 and is not shown in the figure, executing a computer program and functioning according to the computer program, the computer program being stored in a memory that is not shown in the figure.

(4) Configuration of the Pico Base Station 200

Figure 4:
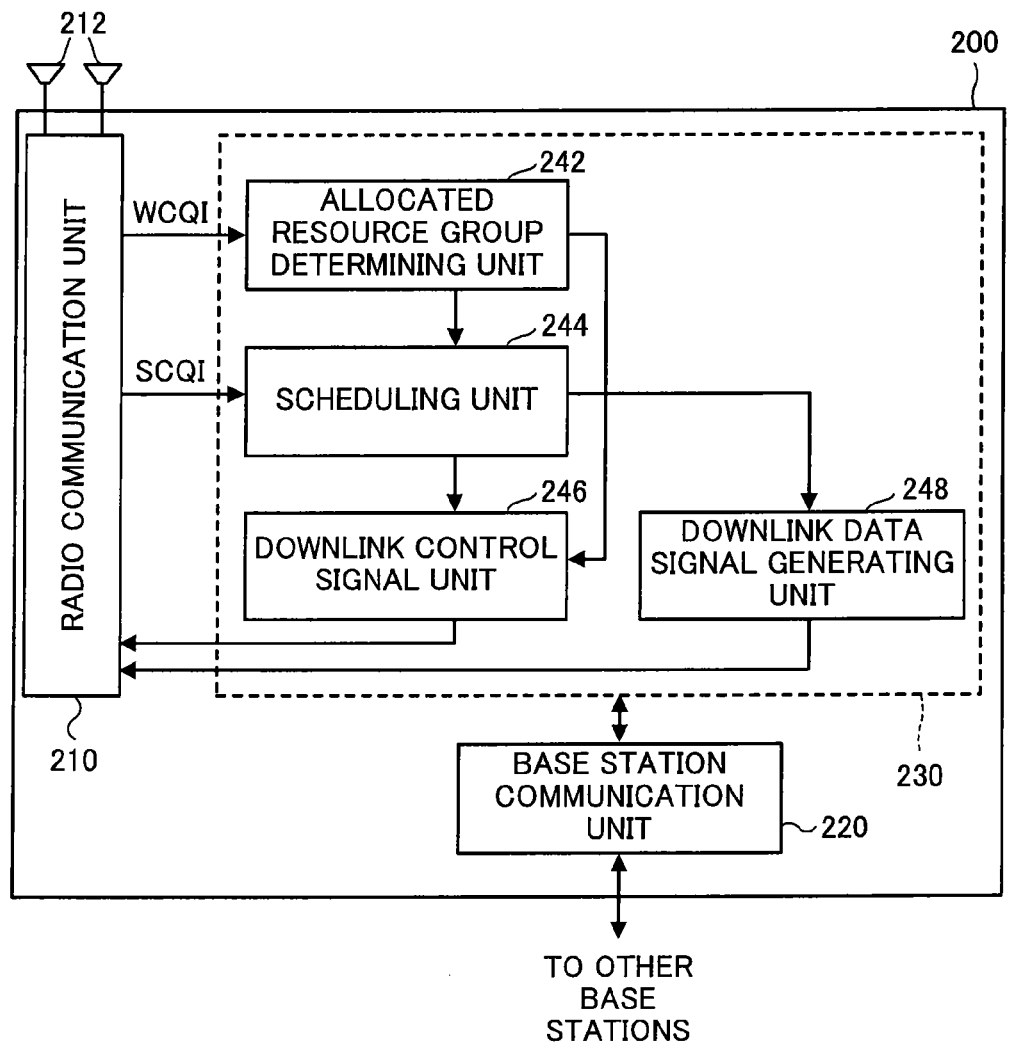
FIG. 4 is a block diagram showing a configuration of a pico base station in the first embodiment of the present invention.

FIG. 4 is a block diagram illustrating a configuration of the pico base station 200 according to the embodiment of the present invention. The pico base station 200 includes a radio communication unit 210, a base station communication unit 220, and a control unit 230. The pico base station 200 is an open-access base station that allows any user terminal UE to connect wirelessly.

The radio communication unit 210, a component for communicating wirelessly with the user terminal UE, includes a transceiver antenna 212, a receiving circuit for receiving radio waves from the user terminal UE and converting the radio waves to electrical signals, a signal separating unit for separating the converted electrical signals into data signals and control signals, a signal multiplexing unit for multiplexing the data signals and the control signals provided by the control unit 230, and a transmitting circuit for converting the multiplexed electrical signals to radio waves and transmitting the converted radio waves.

The base station communication unit 220, a component for communicating with the macro base station 100 to which the pico base station 200 itself connects, transmits and receives electrical signals to and from the macro base station 100 via wired or wireless connection.

The control unit 230, as its components, includes an allocated resource group determining unit 242, a scheduling unit 244, a downlink control signal generating unit 246, and a downlink data signal generating unit 248. Operations of the control unit 230 are described later in detail.

The control unit 230 and the components included in the control unit 230, the allocated resource group determining unit 242, the scheduling unit 244, the downlink control signal generating unit 246, and the downlink data signal generating unit 248, are a functional block performed by a central processing unit (CPU), which is in the pico base station 200 and is not shown in the figure, executing a computer program and functioning according to the computer program, the computer program being stored in a memory that is not shown in the figure.

The pico base station 200 can receive and transfer information transmitted by the macro base station 100 to the user terminal UE and information transmitted by the user terminal UE to the macro base station 100.

Specifically, the control unit 230 provides the radio communication unit 210 with electrical signals containing information that the base station communication unit 220 of the pico base station 200 has received from the macro base station 100. The radio communication unit 210 converts the provided electrical signals to radio waves and transmits the radio waves to the user terminal UE. Similarly, the control unit 230 provides the base station communication unit 220 with electrical signals containing information transmitted by the user terminal UE, the electrical signals being obtained by the radio communication unit 210 of the pico base station 200 receiving and converting radio waves. The base station communication unit 220 transmits the provided electrical signals to the macro base station 100.

In the configuration described above, even when it is difficult for the user terminal UE to communicate wirelessly with the macro base station 100 because the user terminal UE and the pico base station 200 are close to each other (i.e., because the power of interference from the pico base station 200 at the user terminal UE is high), it is possible to transmit and receive necessary information between the user terminal UE and the macro base station 100.

(5) Heterogeneous Network (HetNet)

Since a macro base station 100 has a high radio transmission capacity (maximum transmission power, average transmission power, etc.) compared to a pico base station 200, the macro base station 100 can communicate wirelessly with a user terminal UE at a greater distance than the pico base station 200 can. In other words, an area of the macrocell Cm is greater than that of the picocell Cp (e.g., the macrocell Cm has an area with a radius of several hundred meters to dozens of kilometers, and the picocell Cp has an area with a radius of several meters to dozens of meters).

As can be understood from the description above, the macro base station 100 and the pico base station 200 within the radio communication system 1 constitute a heterogeneous network in which multiple kinds of base stations with different transmission powers (transmission capacities) are placed in a multilayered way (e.g., refer to 3rd Generation Partnership Project; Technical Specification Group Radio Access Network; Evolved Universal Terrestrial Radio Access (E-UTRA); Further advancements for E-UTRA physical layer aspects (Release 9); 3GPP TR 36.814 V9.0.0 (2010-03); Section 9A, Heterogeneous Deployments).

In the heterogeneous network, radio connection to, and communication traffic concentration at, the macro base station 100 is curbed by the user terminal UE connecting to the pico base station 200 located inside the macrocell Cm (offloading). Thus, frequency utilization efficiency per unit area can be improved. Preferably, the pico base station 200 is placed at a hotspot (e.g., at a railroad station) at which communication traffic is concentrated.

However, as described above, an area of the picocell Cp formed by the pico base station 200 is small, meaning that the radio transmission capacity of the pico base station 200 is low; so in a configuration (e.g., the configuration of FIG. 6, described later) in which a base station to which a user terminal UE is to connect wirelessly is selected on the basis of received power (Reference Signal Received Power, RSRP) at the user terminal UE, a large number of user terminals UE are connected to the macro base station 100 with a high radio transmission capacity. As a result, effectiveness in curbing radio connection and communication traffic concentration by offloading may be limited.

(6) Cell Range Expansion (CRE)

For the heterogeneous network, therefore, Cell Range Expansion technology has been suggested. In Cell Range Expansion technology, an offset (bias value) is added to received power P2 from the pico base station 200 with a low radio transmission capacity before a user terminal UE decides with which base station it should establish a radio connection. Thus, a greater number of user terminals UE are to be connected to the pico base station 200, and radio connection to, and communication traffic concentration at, the macro base station 100 can be curbed. With reference to FIG. 5 to FIG. 8, Cell Range Expansion is described below.

Figure 5:
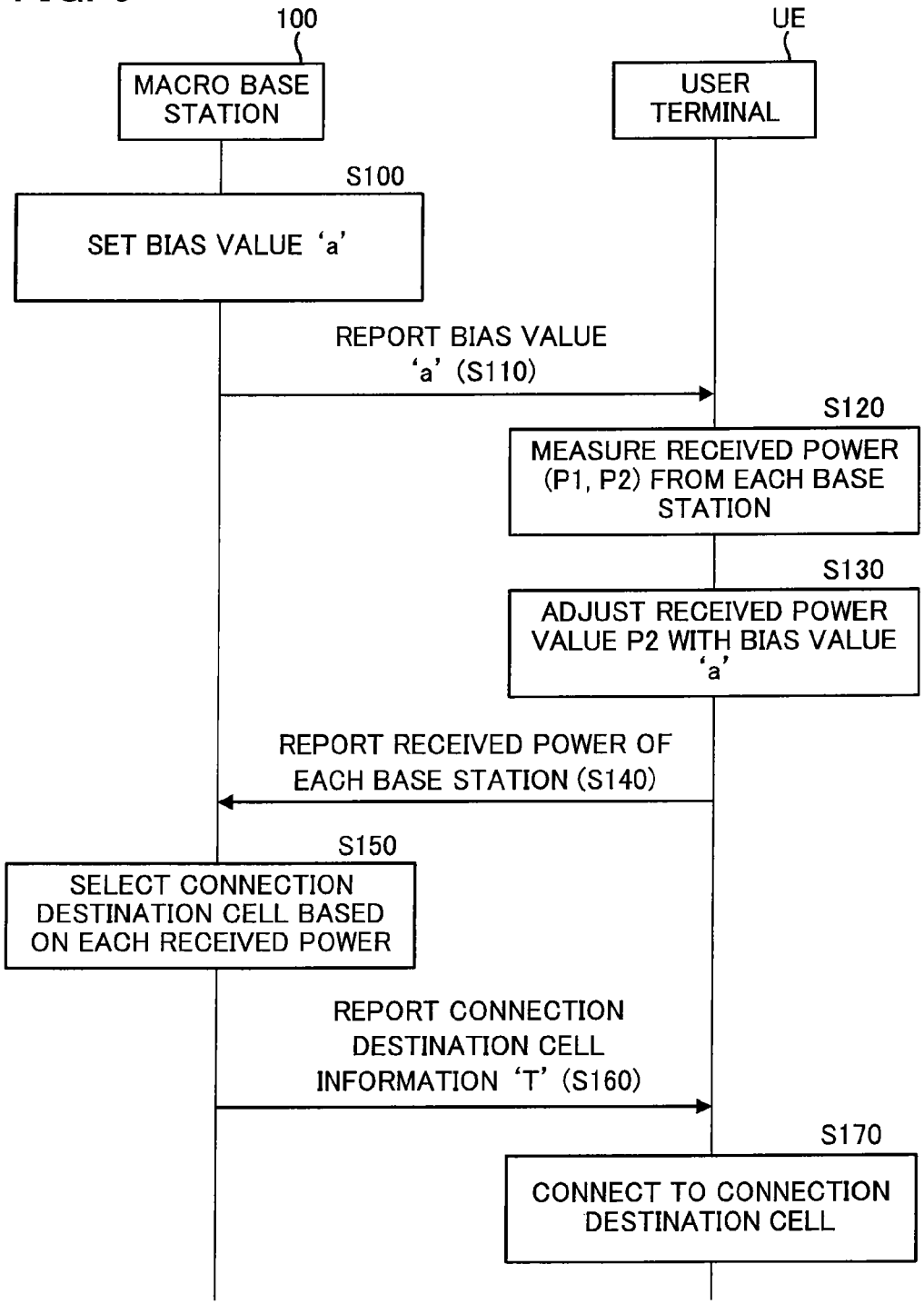
FIG. 5 is a diagram showing an operation to adjust a received power value in the radio communication system.

FIG. 5 is a flow diagram illustrating an operation to adjust a received power value in Cell Range Expansion. The bias value setting unit 150 of the macro base station 100 sets a bias value 'a' (step S100). A way to set the bias value 'a' can be chosen freely. For example, the value could be set on the basis of the amount of communication traffic at the macro base station 100 or the number of the user terminals UE connected to the macro base station 100. The bias value signaling unit 152 transmits (reports) the bias value 'a' set by the bias value setting unit 150 to the user terminal UE through the radio communication unit 110 (step S110).

Figure 8:
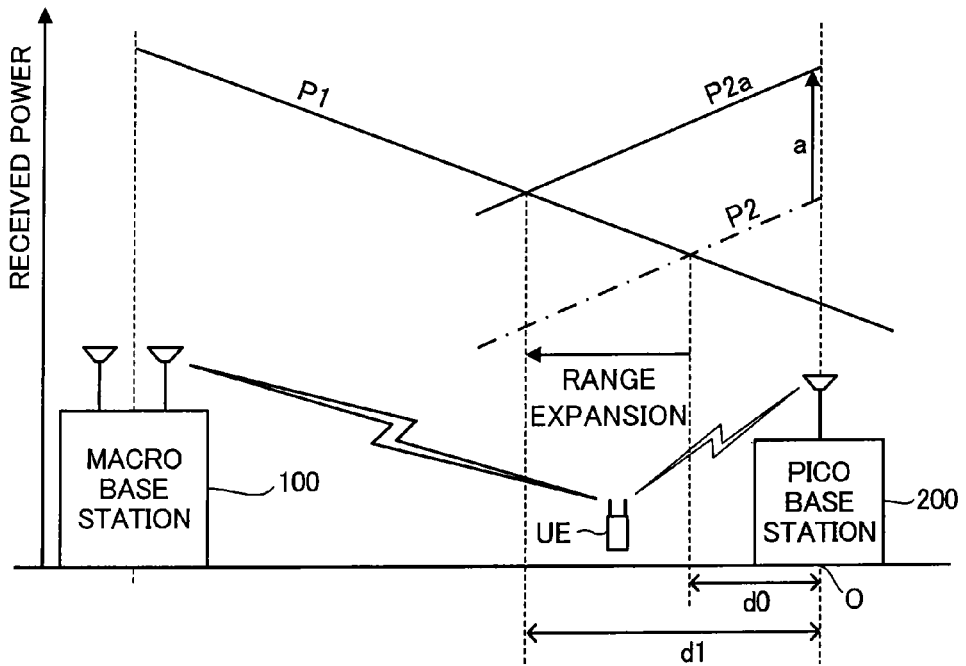
FIG. 8 is an explanatory diagram illustrating the adjusting operation on the received power in the first embodiment of the present invention.

The received power measuring unit 352 of the user terminal UE, on the one hand, measures received power of radio waves received from the macro base station 100 and obtains a first received power value P1; on the other hand, it measures received power of the radio waves received from the pico base station 200 and obtains a second received power value P2 (step S120). The received power adjusting unit 354 of the user terminal UE adjusts the received power value P2 of the radio waves received from the pico base station 200 by using the bias value 'a' reported by the bias value signaling unit 152 (step S130). Specifically, the received power adjusting unit 354 adds the bias value 'a' to the received power value P2 of the radio waves received from the pico base station 200 to obtain an adjusted second received power value P2a. In other words, as shown in FIG. 8, the received power value P2 of the radio waves received at the user terminal UE is offset with the bias value 'a' to become the adjusted second received power value P2a for the pico base station 200.

The received power signaling unit 356 of the user terminal UE transmits (reports) the first received power value P1 and the adjusted second received power value P2a to the macro base station 100 through the radio communication unit 310 (step S140). Each of the reported received power values (P1, P2a) is provided to the destination selecting unit 154 through the radio communication unit 110. The destination selecting unit 154 of the macro base station 100 selects, as a radio connection destination for the user terminal UE, the base station (the macro base station 100, the pico base station 200) corresponding to the received power value showing the higher received power of the two values reported by user terminal UE, the two values being the first received power value P1 and the second received power value P2a (step S150). The destination selecting unit 154 reports connection destination cell information T that shows the selected radio connection destination to the user terminal UE through the radio communication unit 110 (step S160).

Alternatively, the destination selecting unit 154 of the macro base station 100 may select a base station as a radio connection destination on the basis of the ratio of the first received power value P1 and the adjusted second received power value P2a, the ratio having been calculated and reported to the macro base station 100 by the received power signaling unit 356 of the user terminal UE.

At step S170, the connecting unit 358 of the user terminal UE creates a connection with the destination cell indicated by the connection destination cell information T received from the macro base station 100 (if already connected to the destination cell indicated by the connection destination cell information T, the user terminal UE maintains the connection). For example, when the user terminal UE is being connected to the macrocell Cm and upon receiving the connection destination cell information T indicating the picocell Cp as the destination cell, the connecting unit 358 will have the user terminal UE itself reconnect (offload) to the specified picocell Cp.

Figure 6:
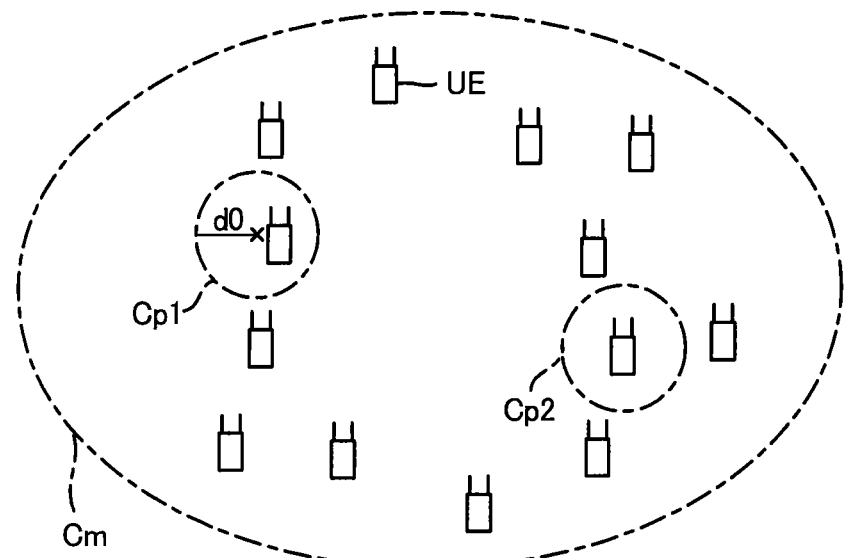
FIG. 6 is a diagram showing a state before Cell Range Expansion by the adjusting operation.
Figure 7:
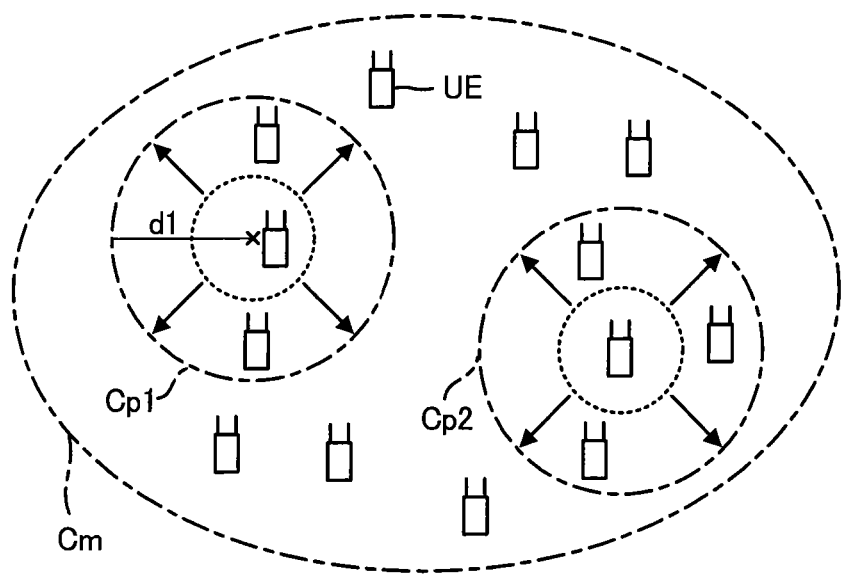
FIG. 7 is a diagram showing a state after Cell Range Expansion by the adjusting operation.

FIG. 6 is a diagram illustrating a state before Cell Range Expansion by the above-mentioned adjustment being made; FIG. 7 is a diagram illustrating a state after Cell Range Expansion is applied. For simplicity, the macro base station 100 and the pico base station 200 are omitted in FIG. 6 and FIG. 7; however, it will be understood, as a matter of course, that each cell (the macrocell Cm, the picocell Cp) has the corresponding base station (the macro base station 100, the pico base station 200, respectively) in its center. As shown in FIG. 6 and FIG. 7, with Cell Range Expansion using the bias value 'a', a greater number of the user terminals UE are located inside picocells (Cp1, Cp2) as a consequence of the radius of each of the picocells (the Cp1, the Cp2) being increased from d0 to d1 (d1>d0). In other words, with Cell Range Expansion, a greater number of the user terminals UE are wirelessly connected to the pico base station 200.

FIG. 8 is a diagram illustrating a change in the range of the picocell Cp, as explained by referring to FIG. 6 and FIG. 7, with a relationship to the macro base station 100. As shown in FIG. 8, the farther from each of the base stations a measuring point is, the lower the measured received power values (P1, P2) become. At the location of the user terminal UE in FIG. 8, while the received power value P1 of the radio waves from the macro base station 100 is greater than the received power value P2 of the radio waves from the pico base station 200, the adjusted received power value P2a, which is the received power value of the radio waves from the pico base station 200 after adjustment with the bias value 'a', is greater than the received power value P1. Consequently, the destination selecting unit 154 of the macro base station 100 selects the pico base station 200 as the radio connection destination for the user terminal UE in FIG. 8.

In the manner described above, the Cell Range Expansion of the present embodiment is carried out. However, the bias value 'a' is a value used only for determining a connection destination; there is no change in the received power value P2 from the pico base station 200 in itself at the user terminal UE. Thus, the UE connected to the pico base station 200 by the Cell Range Expansion (the user terminal UE that would otherwise have been connected to the macro base station 100 if not for the adjustment with the bias value 'a') experiences severe interference from the macro base station 100.

(7) Inter-Cell Interference Coordination (ICIC)

In the heterogeneous network, therefore, Inter-Cell Interference Coordination technology has been suggested. In Inter-Cell Interference Coordination, interference at a user terminal UE wirelessly connected to the pico base station 200 can be curbed by partially stopping radio transmission by the macro base station 100 in a time domain or in a frequency domain.

Figure 9:
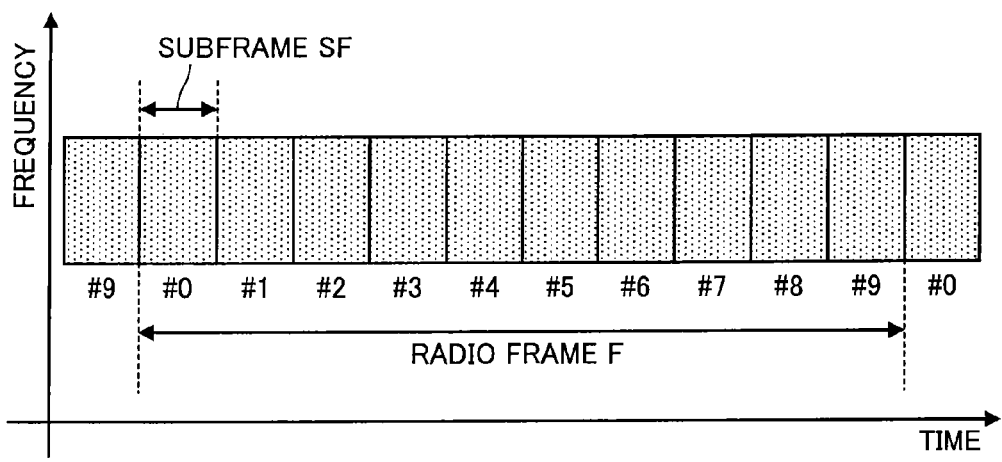
FIG. 9 is a diagram showing a format of a radio frame that is transmitted and received in the radio communication system.

FIG. 9 is a diagram showing a format of a radio frame F that is transmitted and received between each of the communication components in the radio communication system 1. The radio frame F is a transmission unit of radio signals transmitted by each of the communication components (the macro base station 100, the pico base station 200, the user terminal UE, etc.) and occupies a predetermined length of time (e.g., 10 ms) and a predetermined frequency bandwidth (e.g., 15 MHz). A series of radio signals is constituted by the radio frames F being transmitted continuously.

The radio frame F includes subframes SF. The subframe SF is a transmission unit that occupies a shorter length of time (e.g., 1 ms) than the radio frame F. Each of the subframes SF includes resource blocks RB (not shown in the figure). The resource block RB is a transmission unit that occupies a shorter length of time (e.g., 0.5 ms) than the subframe SF and a predetermined narrower frequency bandwidth (e.g., 180 kHz) than the subframe SF.

Figure 10:
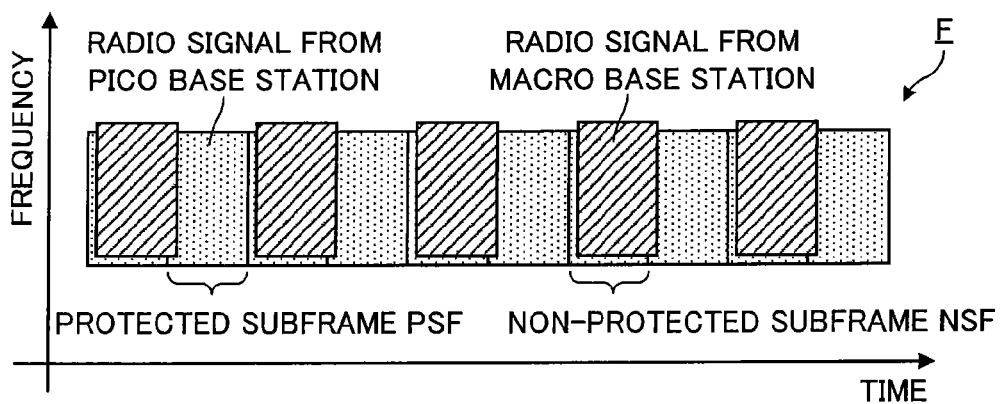
FIG. 10 is an explanatory diagram illustrating Inter-Cell Interference Coordination in a time domain in the first embodiment of the present invention.

FIG. 10 illustrates an example of Inter-Cell Interference Coordination in a time domain. The radio communication unit 110 of the macro base station 100 switches between transmitting radio signals and not transmitting radio signals for each subframe SF. On the other hand, the radio communication unit 210 of the pico base station 200 transmits radio signals continuously; in other words, the radio communication unit 210 of the pico base station 200 transmits radio signals to the user terminal UE in both a non-protected subframe NSF and a protected subframe PSF.

The subframe SF in which transmission of radio signals from the macro base station 100 is stopped is called the "protected subframe PSF" since the radio signals from the pico base station 200 transmitted in the protected subframe PSF are protected from interference from the radio signals transmitted by the macro base station 100; similarly, the subframe SF in which the macro base station 100 transmits radio signals is called the "non-protected subframe NSF". Hereinafter, a group of the protected subframes PSF may be called a "protected resource group", and a group of the non-protected subframes NSF may be called a "non-protected resource group".

In the protected subframe PSF in which the radio communication unit 110 of the macro base station 100 does not transmit radio signals, only the radio communication unit 210 of the pico base station 200 transmits radio signals. Consequently, since a period during which the radio signals from the pico base station 200 do not experience interference from the radio signals from the macro base station 100 (the protected subframe PSF) is provided, throughput in the picocell Cp increases. On the other hand, throughput in the macrocell Cm decreases because the macro base station 100 stops transmitting radio signals.

The user terminal UE wirelessly connected to the pico base station 200 (hereinafter, may be referred to as a "pico-connected user terminal PUE") performs downlink radio communication by using either or both of the non-protected subframes NSF and the protected subframes PSF.

Figure 11:
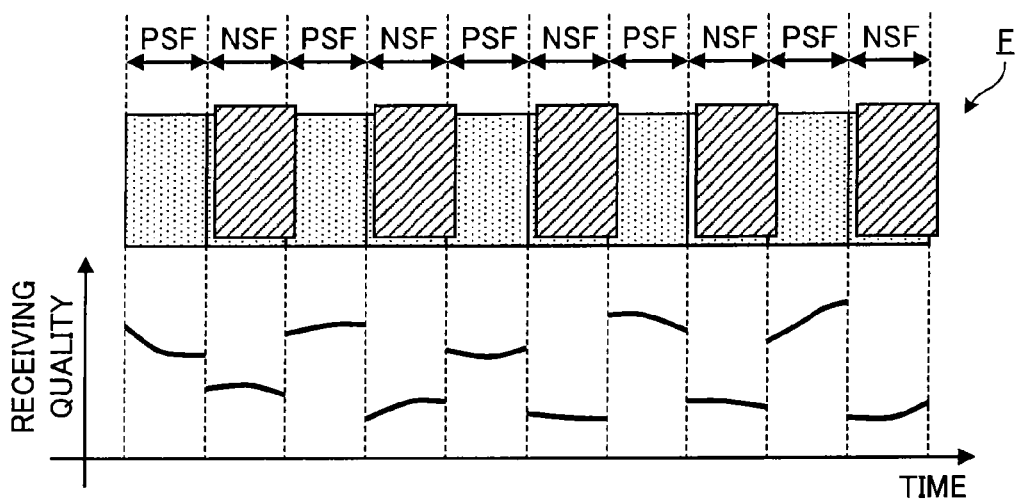
FIG. 11 is a diagram showing fluctuations in a receiving quality (a channel quality index) at the user terminal connected to the pico base station.

FIG. 11 is a diagram showing fluctuations in a channel quality index (CQI) at a pico-connected user terminal PUE in each subframe SF. Generally, a receiving quality (a channel quality index CQI) of radio waves from a base station at a user terminal UE varies in every moment with the propagation environment of the radio waves. In addition, in the present embodiment, radio resources available to the pico-connected user terminal PUE change frequently. As a result, as shown in FIG. 11, while a high receiving quality (the channel quality index CQI) is obtained in the protected subframes PSF without interference from the macro base station 100, a receiving quality (the channel quality index CQI) of the non-protected subframes NSF with interference from the macro base station 100 is relatively low.

(8) Radio Resource Scheduling

In downlink radio communication from the base stations (the macro base station 100, the pico base station 200) to a user terminal UE, the allocated resource group determining units (142, 242) and the scheduling units (144, 244) of the base stations to which the user terminal UE is wirelessly connected allocate, to the user terminal UE, radio resources (e.g., resource blocks RB) to be used for downlink radio communication on the basis of the channel quality index CQI reported by the user terminal UE.

Since radio resources (e.g., frequency bands and time) available for communication between the base stations and the user terminal UE are limited, fairness in allocating the radio resources to the user terminals UE should be provided from a standpoint of availability and convenience for users. On the other hand, from a standpoint of the overall capacity of the radio communication system 1, throughput at the base stations should be improved. Generally, there is a trade-off between fairness and throughput in radio communication. In other words, radio resources need to be allocated to a user terminal UE with a high receiving quality to improve throughput; however, to improve fairness, the radio resources need to be allocated to a user terminal UE with a low receiving quality.

Proportional Fairness has been known as a scheduling scheme that can both maintain fairness in radio resource allocation among user terminals UE and improve throughput of the overall system. Specifically, by using proportional fairness for a scheduling scheme, radio resources are allocated so as to maximize an objective function f as in Expression (1) below where x(n) represents throughput at each of the user terminals UE(1), UE(2), . . . , UE(n) (n is a natural number).

$$f = \frac{1}{N}\sum_{n=1}^{N} \log(x(n)) \quad (1)$$

Details of proportional fairness are explained in, for instance, F. Kelly, A. Maulloo and D. K. Tan, "Rate control in communication networks: shadow prices, proportional fairness and stability," J. of the Operational Research Society, vol. 49, pp. 237-252, April 1998.

(9) Configuration and Operations of Radio Resource Scheduling

A receiving quality (a channel quality index CQI) of each of the radio resources available for use between the base stations (the macro base station 100, the pico base station 200) and the user terminal UE is used for radio resource scheduling. The channel quality index CQI can be a value directly expressing the receiving quality of the radio resources or can be a control parameter that is calculated on the basis of the receiving quality and represents a request to the base stations (e.g., a data rate the user terminal UE requests from the base stations). Parameters such as signal-to-interference-plus-noise-power ratio (SINR), rank indicator corresponding to the number of streams in coordinated multi-point transmission and reception (CoMP), or precoding matrix indicator (PMI) could be used for the channel quality index CQI.

As stated above, the user terminal UE wirelessly connected to the pico base station 200 (the pico-connected user terminal PUE) can perform downlink radio communication by using either or both of the non-protected subframes NSF (the non-protected resource group) and the protected subframes PSF (the protected resource group).

Figure 12:
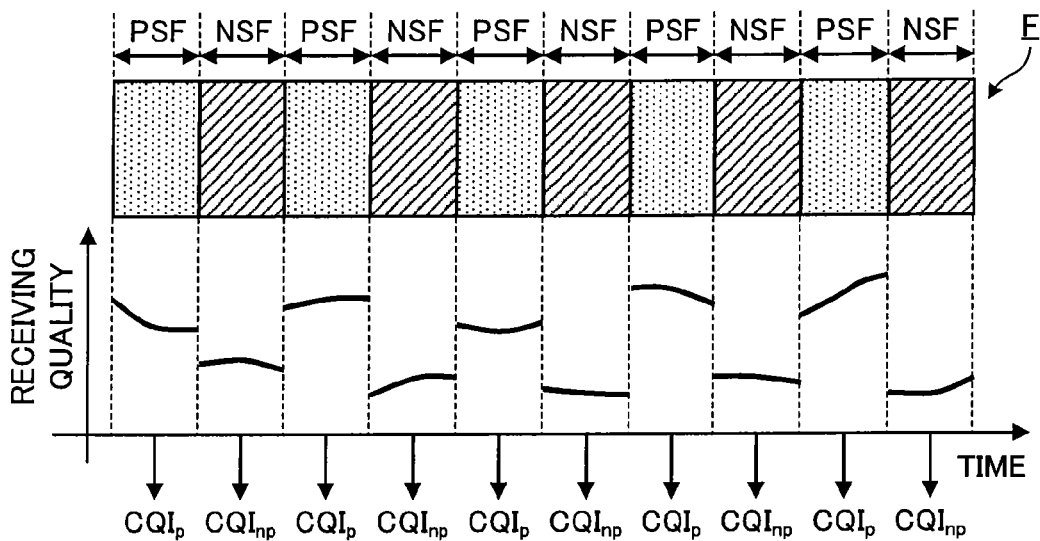
FIG. 12 is a diagram illustrating a state in which the user terminal is reporting the channel quality index successively.

As shown in FIG. 12, the pico-connected user terminal PUE measures and reports a channel quality index $CQI_p$ that indicates the receiving quality of the protected subframes PSF and a channel quality index $CQI_{np}$ that indicates the receiving quality of the non-protected subframes NSF. In the configuration shown in FIG. 12, because the channel quality index $CQI_p$ and the channel quality index $CQI_{np}$ are reported to the base station as they are measured, overhead for reporting (CQI feedback) is too high.

Figure 13:
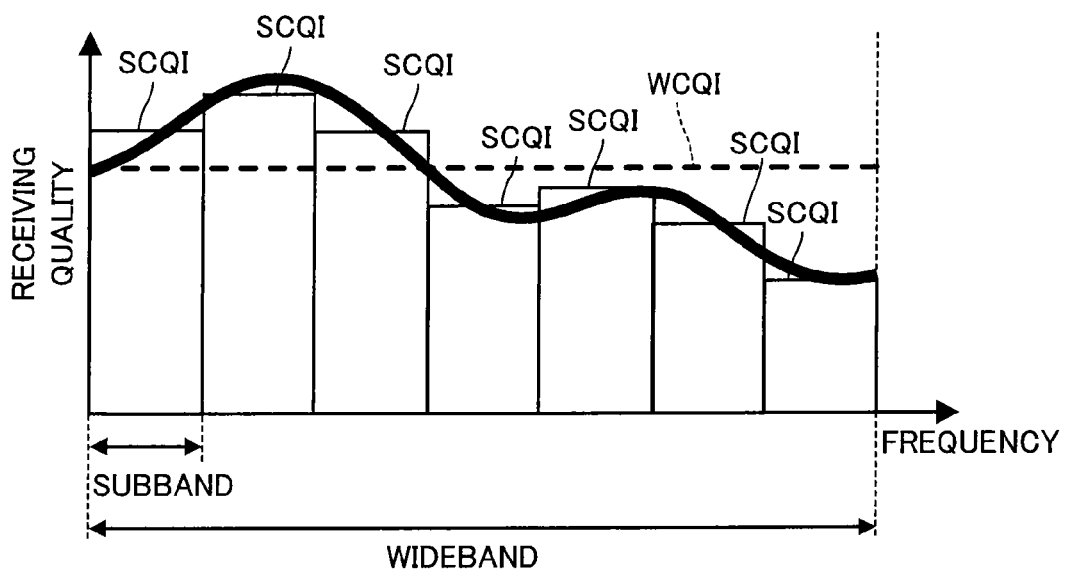
FIG. 13 is a diagram illustrating a relationship between a wideband channel quality indicator (WCQI) and a subband channel quality indicator (SCQI).

In the radio communication system 1 based on LTE, the wideband channel quality indicator (WCQI) and the subband channel quality indicator (SCQI) are used as the channel quality indices that are reported to the base stations by the user terminal UE to perform radio resource scheduling appropriate for each frequency band. As illustrated in FIG. 13, the wideband channel quality indicator WCQI represents the average receiving quality of all the available frequency bandwidths (wideband), and the subband channel quality indicator SCQI represents a receiving quality of a part of all the available frequency bandwidths (subband, e.g., 1.5 MHz in width).

The wideband channel quality indicator WCQI is reported to the base stations by the WCQI measuring unit 342 of the user terminal UE. Since the wideband channel quality indicator WCQI is a single value representing all the frequency bands, the WCQI cannot indicate a change in the receiving quality in the frequency domain; however, overhead for reporting the WCQI is low. On the other hand, the subband channel quality indicator SCQI is reported to the base station by the SCQI measuring unit 344 of the user terminal UE. Since the subband channel quality indicators SCQI are multiple values representing the receiving quality of each of the subbands contained in all the frequency bands, the SCQI can indicate a change in the receiving quality in the frequency domain; however, overhead for reporting the SCQI is high.

Thus, when the pico-connected user terminal PUE (the SCQI measuring unit 344) reports both the subband channel quality indicators $SCQI_p$ of the protected subframes PSF and the subband channel quality indicators $SCQI_{np}$ of the non-protected subframes NSF to the base station, overhead for reporting (the CQI feedback) is too high.

Figure 14:
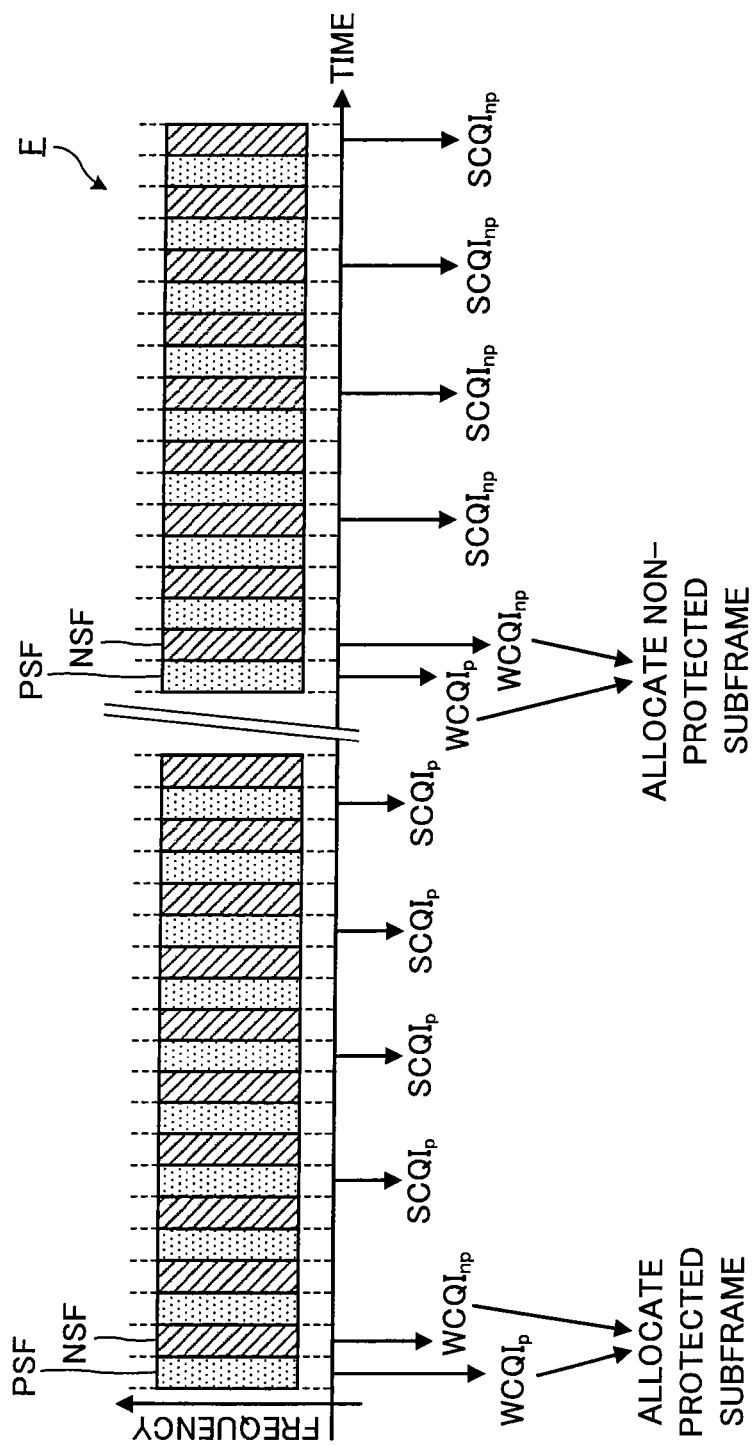
FIG. 14 is a schematic diagram illustrating reporting of the wideband channel quality indicators and the subband channel quality indicators in the first embodiment of the present invention.

In the present embodiment, therefore, as schematically shown in FIG. 14, the pico base station 200 first allocates the protected subframes PSF (the protected resource group) or the non-protected subframes NSF (the non-protected resource group) to the pico-connected user terminal PUE on the basis of the wideband channel quality indicators WCQI (the $WCQI_p$ and the $WCQI_p$) reported by the pico-connected user terminal PUE (hereinafter, this operation may be referred to as "radio resource group allocation"). The pico-connected user terminal PUE then reports the subband channel quality indicators SCQI of the protected subframes PSF or the non-protected subframes NSF (the $SCQI_p$ or the $SCQI_{np}$), whichever is allocated, to the pico base station 200. On the basis of the wideband channel quality indicators WCQI and the subband channel quality indicators SCQI, the pico base station 200 performs scheduling of the radio resources (the resource blocks RB) to be allocated for downlink radio communication with the pico-connected user terminal PUE.

Figure 15:
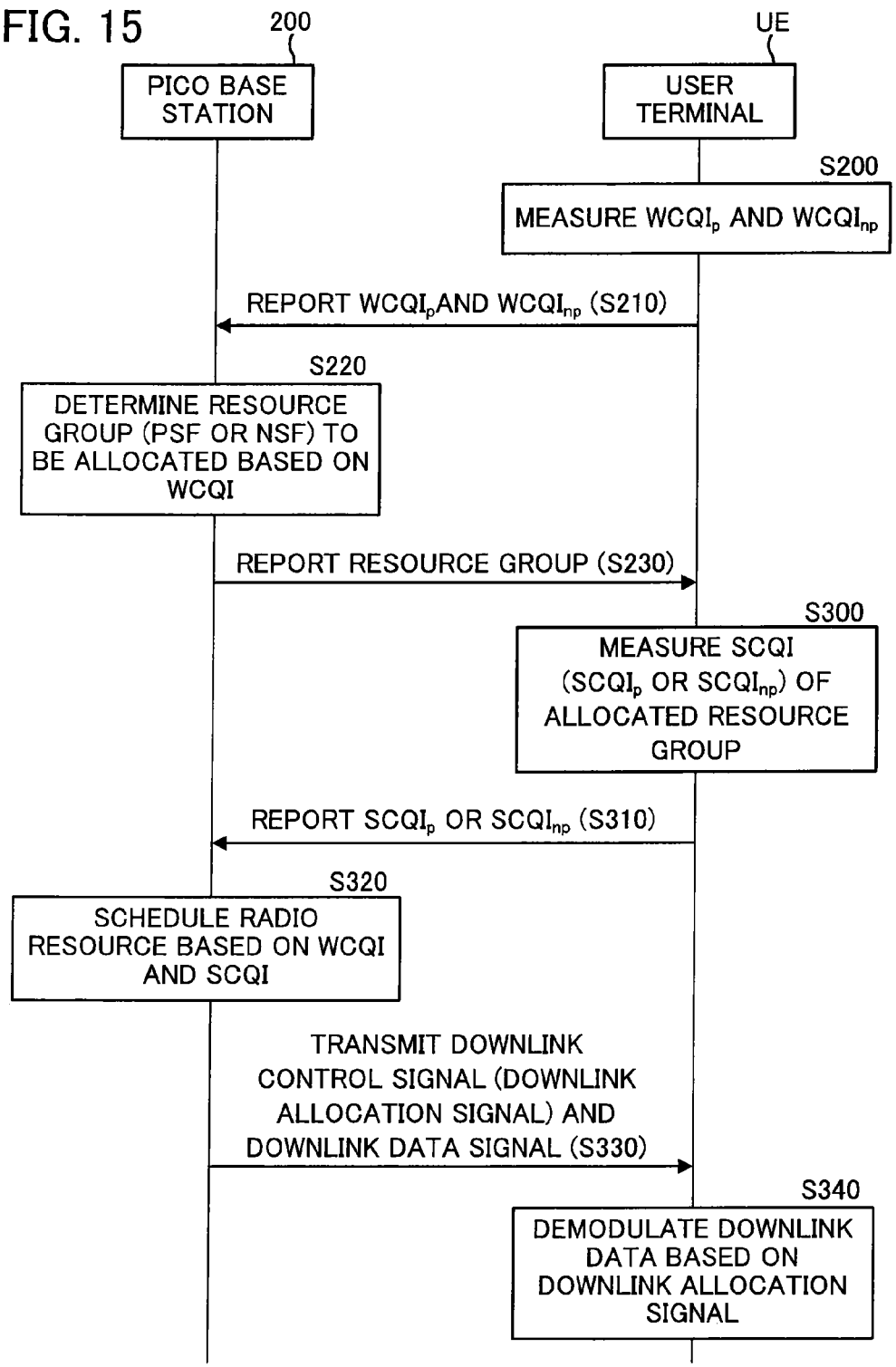
FIG. 15 is a flow diagram showing how a radio resource group is allocated and scheduled in the first embodiment of the present invention.

FIG. 15 is an operational flow illustrating the radio resource group allocation and the radio resource scheduling of the present embodiment.

Following a downlink control signal from the pico base station 200, the WCQI measuring unit 342 of the user terminal UE first measures the wideband channel quality indicator $WCQI_p$ of the protected subframes PSF and the wideband channel quality indicator $WCQI_{np}$ of the non-protected subframes NSF (step S200). Each of the measured wideband channel quality indicators, the $WCQI_p$ and the $WCQI_{np}$, is provided to the uplink control signal generating unit 348 and is transmitted (reported) as an uplink control signal to the pico base station 200 by the radio communication unit 310 (step S210). The radio communication unit 210 of the pico base station 200 receives and separates the wideband channel quality indicators into the $WCQI_p$ and the $WCQI_{np}$, each of which is then provided to the allocated resource group determining unit 242.

The allocated resource group determining unit 242 of the pico base station 200 determines the radio resource group (the protected resource group or the non-protected resource group) to be allocated to the user terminal UE on the basis of the provided wideband channel quality indicators, the $WCQI_p$ and the $WCQI_{np}$ (step S220). Information indicating the allocated radio resource group is provided to the downlink control signal generating unit 246 by the allocated resource group determining unit 242 and is then transmitted (reported) to the user terminal UE as a downlink control signal by the radio communication unit 210 (step S230). In other words, the downlink control signal generating unit 246 here functions as the allocated resource group signaling unit. Information indicating the radio resource group received and separated by the radio communication unit 310 of the user terminal UE is provided to the SCQI measuring unit 344. The "information indicating the allocated radio resource group" is, for example, the to-be-reported subband channel quality indicator SCQI communicated implicitly or explicitly by an uplink allocation signal contained in the downlink control signal.

The SCQI measuring unit 344 of the user terminal UE measures the subband channel quality indicators SCQI (the $SCQI_p$ or the $SCQI_{np}$) of subbands contained in the wideband in the protected subframes PSF or in the non-protected subframes NSF following the information indicating the allocated radio resource group (step S300). The measured subband channel quality indicators SCQI (the $SCQI_p$ or the $SCQI_{np}$) are provided to the uplink control signal generating unit 348 and are transmitted (reported) to the pico base station 200 as an uplink control signal by the radio communication unit 310 (step S310). The subband channel quality indicators SCQI (the $SCQI_p$ or the $SCQI_{np}$) received and separated by the radio communication unit 210 of the pico base station 200 are then provided to the scheduling unit 244.

The scheduling unit 244 of the pico base station 200, on the basis of the provided wideband channel quality indicators WCQI and the provided subband channel quality indicators SCQI, schedules radio resources (e.g., resource blocks RB) to be allocated for downlink radio communication with the user terminal UE and generates a downlink allocation signal (step S320). The scheduling unit 244 provides the generated downlink allocation signal to the downlink control signal generating unit 246 and the downlink data signal generating unit 248. The downlink control signal generating unit 246 generates a downlink control signal containing the provided downlink allocation signal and provides the downlink control signal to the radio communication unit 210. The downlink data signal generating unit 248, on the basis of the provided downlink allocation signal, generates a downlink data signal containing data toward the user terminal UE and provides the downlink data signal to the radio communication unit 210. The radio communication unit 210 multiplexes and then transmits the downlink control signal and the downlink data signal to the user terminal UE (step S330).

The radio communication unit 310 of the user terminal UE separates the radio waves received from the pico base station 200 to obtain and provide the downlink control signal and the downlink data signal to the data demodulating unit 346. The data demodulating unit 346, on the basis of the downlink allocation signal contained in the downlink control signal, demodulates a data signal directed at the user terminal UE from the radio resources (the resource blocks RB) allocated to the user terminal UE itself for the downlink radio communication (step S340).

As described above, the allocation of the radio resource groups is first performed on the basis of the reporting of the wideband channel quality indicators WCQI (steps S200 to S230), and then, on the basis of the allocated radio resource group, the reporting of the subband channel quality indicators SCQI and the reception of the data are performed (steps S300 to S340). Although each operation is described consecutively in the description above for simplicity, steps S200 to S230 that include the reporting of the wideband channel quality indicators WCQI are preferably performed in a longer cycle (less frequently) than steps S300 to S340 that include the reporting of the subband channel quality indicators SCQI.

In addition, considering that a reporting cycle of the channel quality index CQI is generally set to be variable according to a parameter such as the moving speed of the user terminal UE, provided that an execution cycle (frequence) of steps S200 to S230 is longer (lower) than that of steps S300 to S340, each of the execution cycles (frequences) is preferably set to be variable.

(10) Example of Radio Resource Group Allocation

As described above, at step S220, the allocated resource group determining unit 242 of the pico base station 200 determines a radio resource group (a protected resource group or a non-protected resource group) to be allocated to the user terminal UE on the basis of the wideband channel quality indicators (the $WCQI_p$ and the $WCQI_{np}$) provided by the user terminal UE. A more detailed example of the radio resource group allocation is explained below. In this example, each of the user terminals UE is wirelessly connected to a single pico base station 200, unless otherwise stated.

The proportional fairness mentioned above can be implemented by allocating a radio resource group, in a manner described below, to each of the user terminals UE wirelessly connected to the pico base station 200. According to the radio resource group allocation described below, the user terminals UE are classified into the following three types: (a) at least one user terminal UE to which only the protected subframes PSF are allocated; (b) a single user terminal UE to which both the protected subframes PSF and the non-protected subframes NSF are allocated; and (c) at least one user terminal UE to which the non-protected subframes NSF are allocated. The operations described below are performed by the allocated resource group determining unit 242 of the pico base station 200.

For the N user terminals UE(1), UE(2), . . . , UE(N) (where N is a natural number greater than one) connected to the single pico base station 200, the allocated resource group determining unit 242 calculates the differentiation factor D(n) for each of the user terminals UE(n) (where 1≤n≤N) by Expression (2) below.

$$D(n) = \frac{B_p}{B_{np}} \cdot \frac{r_p(n)}{r_{np}(n)} \quad (2)$$

In Expression (2), $B_p$ represents the amount of the protected subframes PSF (the number of the subframes) per unit time period (e.g., 40 subframes), and $B_{np}$ represents the amount of the non-protected subframes NSF (the number of the subframes) per unit time period. Thus, $$\frac{B_p}{B_{np}} \quad (3)$$

in Expression (2) represents the ratio of the protected subframes PSF to the non-protected subframes NSF per unit time period. This example assumes $B_p$=20 and $B_{np}$=20. Thus, Expression (3) in this example is one.

In Expression (2), $r_p(n)$ represents a communication data rate of the user terminal UE(n) obtained in the protected subframes PSF, and $r_{np}(n)$ represents a communication data rate of the user terminal UE(n) obtained in the non-protected subframes NSF. The $r_p(n)$ is a value equivalent to the wideband channel quality indicator $WCQI_p$ of the protected subframes PSF and the $r_{np}(n)$ is a value equivalent to the wideband channel quality indicator $WCQI_{np}$ of the non-protected subframes NSF. Thus, $$\frac{r_p(n)}{r_{np}(n)} \quad (4)$$

in Expression (2) is a value equivalent to the ratio of the wideband channel quality indicator $WCQI_p$ of the protected subframes PSF to the wideband channel quality indicator $WCQI_{np}$ of the non-protected subframes NSF.

As can be understood from Expression (4), a value of the differentiation factor D(n) increases as the wideband channel quality indicator $WCQI_p$ of the protected subframes PSF compared to the wideband channel quality indicator $WCQI_{np}$ of the non-protected subframes NSF becomes greater. Moreover, considering that the wideband channel quality indicator $WCQI_{np}$ of the non-protected subframes NSF at the user terminal UE(n) becomes smaller as the distance between the user terminal UE(n) and the pico base station 200 becomes greater (i.e., interference from the macro base station 100 becomes greater), it can be understood that a value of the differentiation factor D(n) increases as the user terminal UE(n) moves farther away from the pico base station 200.

Thus, in general, the protected subframes PSF (the protected resource group) are preferably allocated to a user terminal UE(n) that has a large value of the differentiation factor D(n) and thus is close to the edge of the picocell Cp, and the non-protected subframes NSF (the non-protected resource group) are preferably allocated to a user terminal UE(n) that has a small differentiation factor D(n) and thus is close to the center of the picocell Cp.

The allocated resource group determining unit 242 then sorts the differentiation factors, D(1), D(2), ..., and D(N), in descending order. Naturally, the sorted differentiation factors, d(n) (where 1≤n≤N), have the following relationship.

$$d(1) \geq d(2) \geq \ldots \geq d(N) \quad (5)$$

Next, the allocated resource group determining unit 242 obtains argument K of the differentiation factor d(n) that satisfies Expression (6) below.

$$K \in \{0, 1, \ldots, N-1\}, \quad (6)$$

such that $$G(d(K+1)) - 1 \leq K < G(d(K))$$

where $$G(x) = \frac{Nx}{1+x}$$

By using the argument K, $\lambda_p$ and $\lambda_{np}$ are defined in Expressions (7) to (9) below.

$$\lambda_p = \max(G(d(K+1)), K) \quad (7)$$

$$\lambda_{np} = N - \lambda_p \quad (8)$$

$$a = \max(G(d(K+1)) - K, 0) \quad (9)$$

By using the values obtained or defined above, the allocated amount of the protected resource $b_p(n)$ and the allocated amount of the non-protected resource $b_{np}(n)$ for the user terminal UE(n) are expressed as in Expression (10) below.

$$\begin{cases} b_p(n) = \frac{B_p}{\lambda_p}, b_{np}(n) = 0 & (n = 1, \ldots, K) \\ b_p(n) = \frac{B_p \cdot a}{\lambda_p}, b_{np}(n) = \frac{B_{np} \cdot (1-a)}{\lambda_{np}} & (n = K+1) \\ b_p(n) = 0, b_{np}(n) = \frac{B_{np}}{\lambda_{np}} & (n = K+2, \ldots, N) \end{cases} \quad (10)$$

Put differently, on the basis of the distribution of the sorted differentiation factors d(n), with the single user terminal UE(K+1) to which both the protected resources and the non-protected resources are to be allocated as a boundary, the user terminals UE(n) except for the user terminal UE(K+1) are classified into the user terminals UE(1), ..., UE(K) having d(n) values greater than d(K+1) and the user terminals UE(K+2), ..., UE(N) having d(n) values smaller than d(K+1). The non-protected resources (the non-protected subframes NSF) are not allocated to the user terminals UE(1), ..., and UE(K) having smaller values of argument n than the boundary user terminal UE(K+1), since $b_{np}(n)=0$. On the other hand, the protected resources (the protected subframes PSF) are not allocated to the user terminals UE(K+2), ..., and UE(N) having greater values of the argument n than the boundary user terminal UE(K+1), since $b_p(n)=0$.

The radio resource group allocation in the above example has a characteristic that only either the protected subframes PSF or the non-protected subframes NSF are to be allocated to the user terminals UE(n) except for the user terminal UE(K+1), so it is suitable for the radio resource group allocation described in "(9) Configuration and Operations of Radio resource Scheduling". For the user terminal UE(K+1) to which both the protected subframes PSF and the non-protected subframes NSF are allocated, the SCQI measuring unit 344 can measure both subband channel quality indicators SCQI (the $SCQI_p$ and the $SCQI_{np}$) at step S300.

(11) Effect of Present Embodiment

According to the embodiment described above, with respect to the user terminal UE wirelessly connected to the pico base station 200, the radio resource group allocation based on the reporting of the wideband channel quality indicators WCQI is performed, and then, on the basis of the allocated radio resource group, the reporting of the subband channel quality indicators SCQI and the data reception are performed. The wideband channel quality indicators WCQI are reported in a longer cycle (less frequently) than the subband channel quality indicators SCQI. Thus, overhead for reporting (feedback) from the user terminal UE can be reduced compared to a configuration in which the subband channel quality indicators SCQI are reported for every radio resource group (the protected subframes PSF and the non-protected subframes NSF). Moreover, since the radio resource groups are allocated to each of the user terminals UE after the user terminals UE are classified on the basis of the distribution of the differentiation factors d(n), the radio resource groups are better allocated compared to the configuration in which the radio resource groups are allocated individually to each of the user terminals UE. Consequently, throughput of the overall radio communication system 1 can be improved.

Second Embodiment

A second embodiment of the present invention is described below. In each embodiment described below, for an element for which operation and function are equivalent to those of the first embodiment, the reference symbols used in the above description are used, and description thereof will be omitted as appropriate.

As described in "(6) Cell Range Expansion", by adding the bias value 'a' to the received power from the pico base station 200, the area of the picocell Cp formed by the pico base station 200 is pseudo-expanded.

Figure 16:
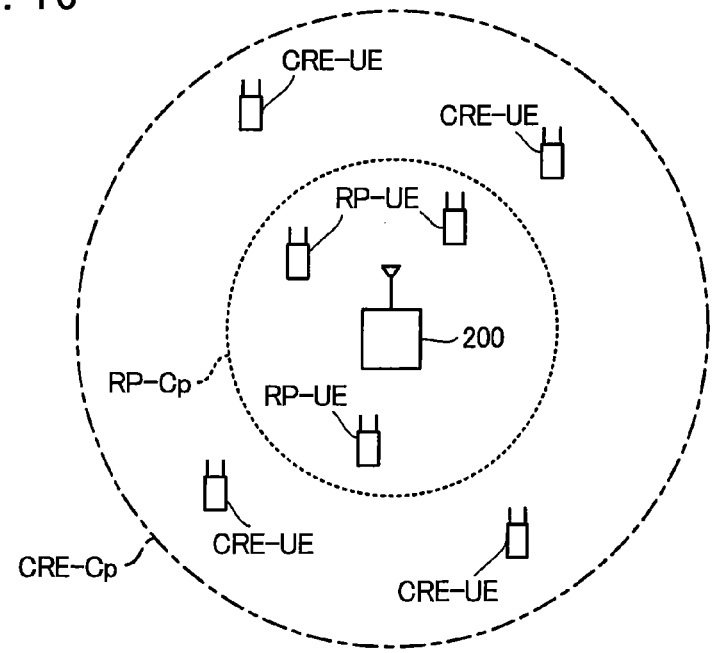
FIG. 16 is a diagram illustrating a state of a picocell before and after Cell Range Expansion in a second embodiment of the present invention.

FIG. 16 illustrates a state of the picocell before expansion (before-expansion picocell RP-Cp) and after Cell Range Expansion (after-expansion picocell CRE-Cp). Hereafter, the user terminal UE located inside the before-expansion picocell RP-Cp is referred to as a "user terminal RP-UE", and the user terminal UE connected to the pico base station 200 by the Cell Range Expansion is referred to as a "user terminal CRE-UE".

The allocated resource group determining unit 242 in the second embodiment calculates the differentiation factor D(n) for the user terminal RP-UE(n) inside the before-expansion picocell RP-Cp as in the first embodiment (i.e., by using Expression (2)).

On the other hand, for the user terminal CRE-UE(n) that is connected to the pico base station 200 by the Cell Range Expansion (i.e., by the adjustment with the bias value 'a'), the allocated resource group determining unit 242 sets a predetermined large value (e.g., a value representing infinity) to the differentiation factor D(n). As stated above, because the user terminal CRE-UE(n) experiences severe interference from the macro base station 100, the receiving quality (the wideband channel quality indicator WCQI) of the non-protected subframe NSF tends to be low. When the wideband channel quality indicator WCQI is low, as stated above, the value of the differentiation factor D(n) is large. Thus, the allocated resource group determining unit 242 can set the predetermined large value to the differentiation factor D(n) for the user terminal CRE-UE(n) regardless of the wideband channel quality indicator WCQI.

Information indicating whether the given user terminal UE is connected to the pico base station 200 with the help of the adjustment with the bias value 'a' or without it (i.e., the magnitude relationship between the received power value P2 without the adjustment and the received power value P1) is provided to the pico base station 200 by the macro base station 100.

It can be understood that after sorting the differentiation factors D(n) set as described above in descending order, the differentiation factor D(n) of the user terminal CRE-UE(n) having the predetermined large value comes to the head part of the sorted list of the differentiation factors d(n). Thus, in the allocation of the radio resource group by Expression (10), the user terminal CRE-UE(n) is increasingly likely to be allocated the protected resource (the protected subframe PSF).

According to the configuration described above, the wideband channel quality indicator WCQI is unnecessary for the radio resource group allocation to the user terminal CRE-UE(n) connected to the pico base station 200 by the Cell Range Expansion. Thus, the pico base station 200 preferably signals the user terminal CRE-UE(n) in advance via the downlink control signal or the like that the wideband channel quality indicator WCQI does not need to be reported. As a result, the user terminal CRE-UE(n) stops reporting the wideband channel quality indicator WCQI, and overhead for reporting (feedback) can be reduced.

Moreover, since the allocated resource group determining unit 242 performs the radio resource group allocation on the basis of the distribution of the differentiation factor d(n) (i.e., on the basis of a relative relationship between the user terminals UE connected to the pico base station 200), the radio resource group is allocated more appropriately as compared to the configuration in which the allocated resource group determining unit 242 simply allocates the non-protected subframe NSF to each of the user terminals RP-UE located inside the before-expansion picocell RP-Cp and the protected subframe PSF to each of the user terminals CRE-UE connected to the pico base station 200 by the Cell Range Expansion.

Third Embodiment

In the embodiments described above, the macro base station 100 (the radio communication unit 110) transmits radio signals to the user terminal UE in the non-protected subframe NSF and stops transmitting radio signals in the protected subframe PSF. On the other hand, the macro base station 100 (the radio communication unit 110) of the present embodiment transmits radio signals in the protected subframe PSF as well.

Figure 17:
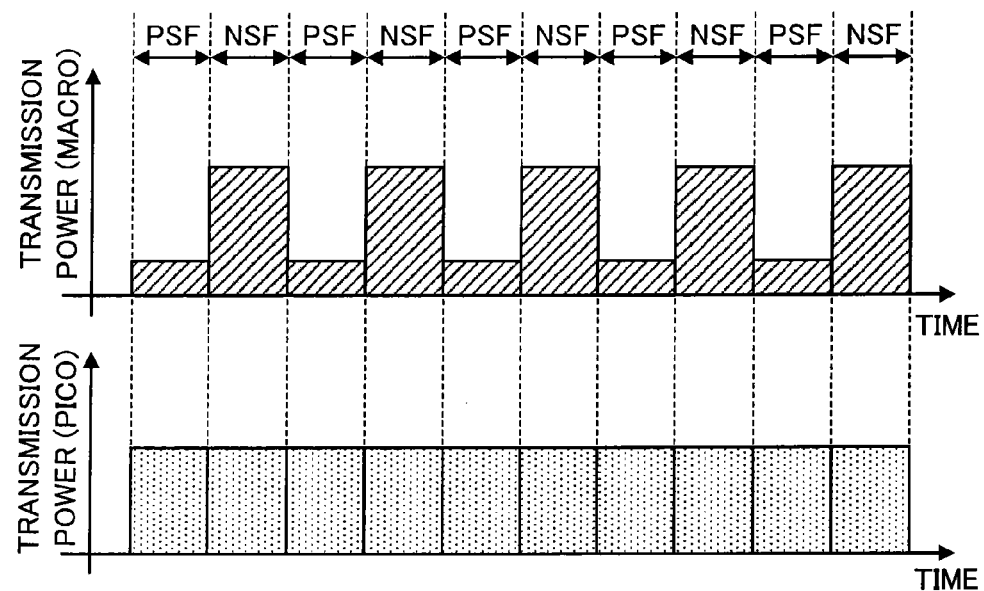
FIG. 17 is a diagram illustrating a state of transmission power of a radio signal in a third embodiment of the present invention.

FIG. 17 is a diagram illustrating transmission power of the radio signals transmitted by base stations (the macro base station 100, the pico base station 200) of the present embodiment. The radio communication unit 210 of the pico base station 200, in a manner similar to that in the aforementioned embodiments, transmits radio signals to the user terminal UE in both the protected subframe PSF and the non-protected subframe NSF. The radio communication unit 110 of the macro base station 100, in the non-protected subframe NSF, transmits radio signals in a manner similar to that in the aforementioned embodiments; and in the protected subframe PSF, on the other hand, it transmits radio signals with a transmission power that is lower than the transmission power used for the non-protected subframe NSF. In other words, for each subframe SF, the radio communication unit 110 of the macro base station 100 shifts the strength of the transmission power of the radio signals from strong to weak, and vice versa. The way in which the transmission power is reduced can be freely chosen; for instance, the radio communication unit 110 of the macro base station 100 may subtract a predetermined value from a transmission power in the non-protected subframe NSF (alternatively, divide a transmission power value in the non-protected subframe NSF by a predetermined value) to calculate the transmission power of the radio signals in the protected subframe PSF.

Figure 18:
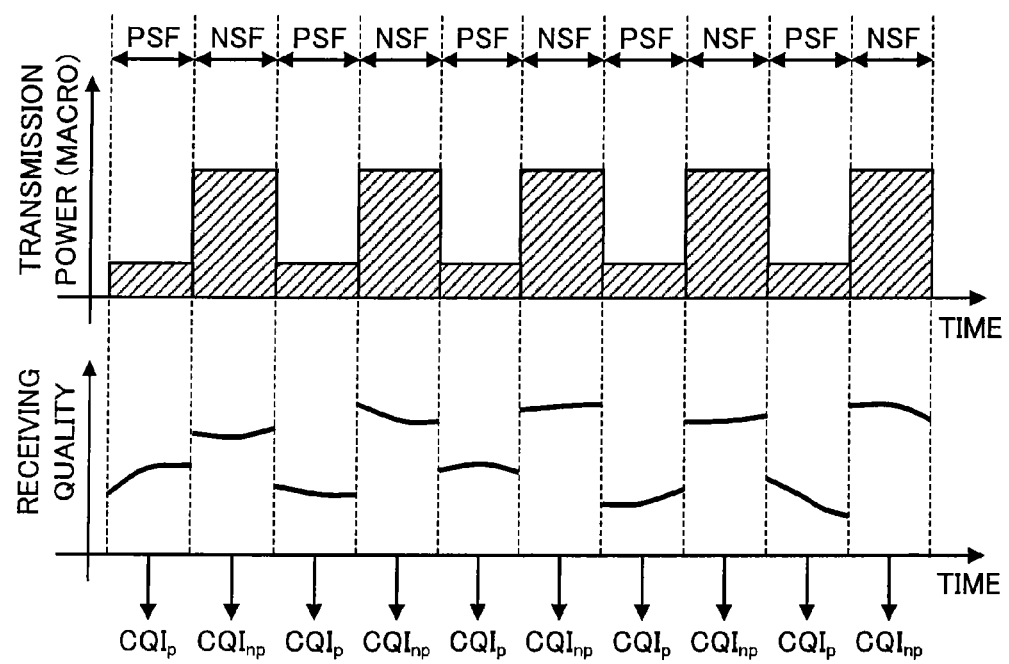
FIG. 18 is a diagram illustrating how the channel quality index is reported in the third embodiment of the present invention.

As shown in FIG. 18, the user terminal UE that is wirelessly connected to the macro base station 100 of the present embodiment (hereinafter, may be referred to as a "macro-connected user terminal MUE"), like the pico-connected user terminal PUE in the aforementioned embodiments, can perform downlink radio communication by using either or both of the non-protected subframe NSF (the non-protected resource group) and the protected subframe PSF (the protected resource group) for which the receiving quality (the channel quality index CQI) differs from each other.

Thus, in the present embodiment, in a manner similar to the above embodiments, the macro base station 100 allocates the protected subframes PSF (the protected resource group) or the non-protected subframes NSF (the non-protected resource) to the user terminal UE on the basis of the wideband channel quality indicators WCQI (the $WCQI_p$ and the $WCQI_{np}$) reported by the macro-connected user terminal MUE. The macro-connected user terminal MUE then reports the subband channel quality indicators SCQI (the $SCQI_p$ or the $SCQI_{np}$) corresponding to the allocated protected subframes PSF or the allocated non-protected subframes NSF to the macro base station 100. The macro base station 100 schedules radio resources (resource blocks RB) to be allocated for downlink radio communication with the pico-connected user terminal PUE on the basis of the wideband channel quality indicators WCQI and the subband channel quality indicators SCQI. Details of the above operations of the macro base station 100 (the allocation of radio resources) are similar to those of the operations of the pico base station 200 described previously (specifically, the operations described with reference to FIG. 15).

In the configuration described above, an effect similar to that in the aforementioned embodiments can be obtained with respect to the user terminal UE connected wirelessly to the macro base station 100; therefore, throughput of the overall radio communication system 1 can be improved.

Fourth Embodiment

In the embodiments described so far, radio resource groups are protected resources (protected subframes PSF) and non-protected resources (non-protected subframes NSF), and a radio resource unit is a subband contained in a wideband in each subframe SF. In other words, in the embodiments described so far, each radio resource group occupies a predetermined time domain, and each radio resource unit occupies a predetermined frequency band. In the present embodiment, an example of a configuration in which each radio resource group occupies a predetermined frequency band is described.

Figure 19:
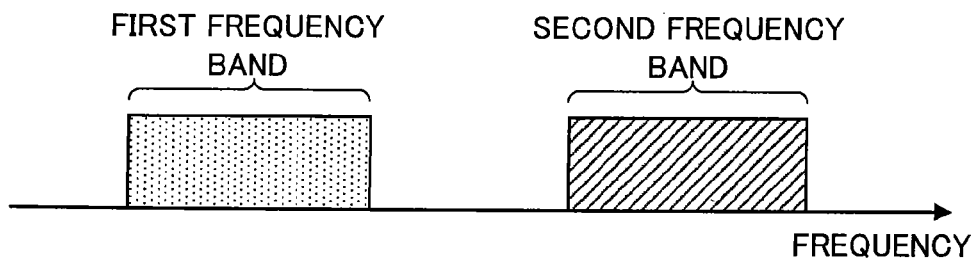
FIG. 19 is a diagram showing radio resource groups (a first frequency band and a second frequency band) in a fourth embodiment of the present invention.

FIG. 19 illustrates frequency bands (a first frequency band and a second frequency band) used for radio communication between a base station (a macro base station 100 or a pico base station 200) and a user terminal UE in the present embodiment. Each of the first frequency band and the second frequency band can be a component carrier in Career Aggregation (CA) defined in LTE-Advanced. Since the first frequency band and the second frequency band are apart from each other, they have different propagation characteristics, such as path loss (propagation loss). Thus, even if a positional relationship between a base station that transmits radio waves and a user terminal UE that receives the radio waves is the same, receiving quality (a wideband channel quality indicator WCQI) of the first frequency band may be different from that of the second frequency band at the user terminal UE.

In addition, in a manner similar to that described above with reference to FIG. 13, a receiving quality can fluctuate for every frequency band (the first frequency band and the second frequency band). Thus, for the base station to perform appropriate frequency scheduling, receiving qualities (subband channel quality indicators SCQI) should also be reported for subbands contained in each frequency band.

Thus, a WCQI measuring unit 342 of the user terminal UE measures the receiving quality (wideband channel quality indicator WCQI) of the first frequency band and that of the second frequency band. Each of the measured receiving qualities is reported to the base station (the macro base station 100 or the pico base station 200) by the user terminal UE. The allocated resource group determining unit (142, 242) of the base station determines at least one frequency band (at least one of the first frequency band and the second frequency band) to be used for radio communication with the user terminal UE on the basis of the wideband channel quality indicator WCQI reported by the user terminal UE, and reports information indicating the at least one determined frequency band to the user terminal UE. An SCQI measuring unit 344 of the user terminal UE, for the frequency band that is reported by the base station and is to be used, measures a subband channel quality indicator SCQI of at least one of the subbands contained in the frequency band. The measured subband channel quality indicator SCQI is reported to the base station by the user terminal UE. The scheduling unit (144, 244) of the base station then schedules radio resources (resource blocks RB, etc.) to be allocated for radio communication with the user terminal UE on the basis of the reported subband channel quality indicator SCQI.

As in the case of the embodiments described above, in order to reduce overhead for reporting, the wideband channel quality indicators WCQI are preferably reported in a longer cycle (less frequently) than the subband channel quality indicators SCQI. Provided that the relative difference in the reporting frequences is maintained, each reporting frequence can be set to be variable.

Figure 20:
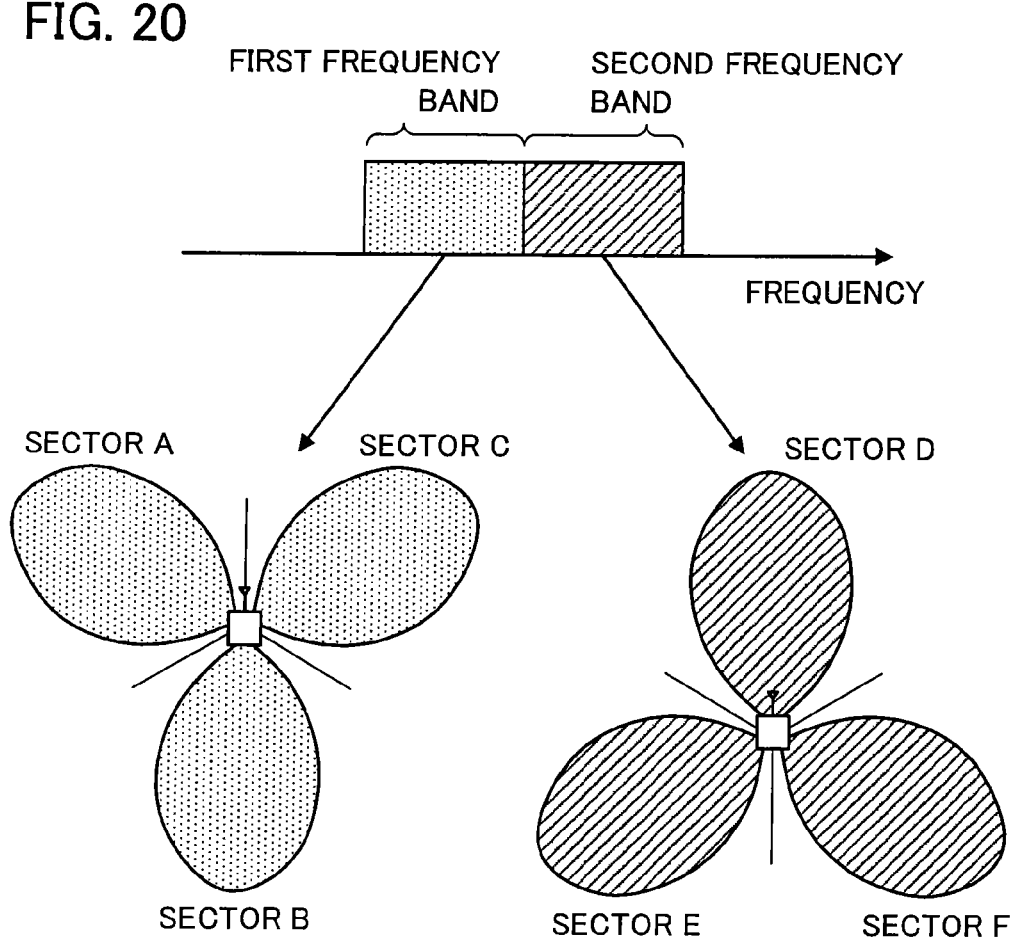
FIG. 20 is a diagram illustrating the radio resource groups (the first frequency band and the second frequency band) and a relationship between the frequency bands and sectors in the fourth embodiment of the present invention.

A configuration, as shown in FIG. 20, in which the first frequency band and the second frequency band are next to each other, is also possible. Frequency bands that are next to each other and are used by a single base station have similar propagation characteristics. However, when sectors (i.e., transmission antennas) for each frequency band are arranged at different angles as shown in FIG. 20, the respective receiving qualities (the wideband channel quality indicators WCQI) of the first frequency band and the second frequency band may be different from each other even if the positional relationship between the base station that transmits radio waves and a user terminal UE that receives the radio waves is the same. Thus, since it is necessary to select from the first frequency band and the second frequency band, the configuration described above is preferably used.

In the configuration described above, as in the first embodiment, with respect to the user terminal UE wirelessly connected to the base station, radio resource groups (frequency bands) are first allocated on the basis of the reported wideband channel quality indicators WCQI, and then, on the basis of the allocated radio resource groups, the subband channel quality indicators SCQI are reported and data are received. The wideband channel quality indicators WCQI are reported in a longer cycle (less frequently) than the subband channel quality indicators SCQI. Thus, compared to a configuration in which the subband channel quality indicators SCQI are always reported for the entire wideband, overhead for reporting (feedback) from the user terminal UE can be reduced.

MODIFICATIONS

The embodiments described above can be modified in various ways. Examples of modifications are described below. Two or more of the modifications can be combined as appropriate, provided that the combined modifications do not conflict with each other.

(1) Modification 1

In the first embodiment to the third embodiment, a radio communication system using Inter-Cell Interference Coordination in a time domain is described; however, a radio communication system may instead use Inter-Cell Interference Coordination in a frequency domain.

As can be understood from the embodiments and the modification described so far, in the present invention, in a radio communication system that utilizes radio resource groups (e.g., protected resources and non-protected resources, frequency bands (component carriers), etc.) for communication, a radio resource group to be used (allocated) for radio communication is selected on the basis of the receiving qualities of the radio resource groups, and then scheduling of radio resources (resource blocks, etc.) is performed on the basis of the receiving qualities of radio resource units (subbands, subframes, etc.) contained in the selected radio resource group. Thus, the present invention is not limited to the specific configurations described above.

(2) Modification 2

In the first embodiment and the second embodiment, a pico base station 200 allocates radio resource groups to a user terminal UE and schedules radio resources; however, a macro base station 100 that operates in cooperation with a pico base station 200 may instead allocate radio resource groups to the user terminal UE and schedule radio resources. Moreover, the operations performed by the pico base station 200 may be divided between the macro base station 100 and the pico base station 200. Similarly, operations performed by the macro base station 100 (setting and reporting a bias value 'a', selecting a radio connection destination, etc.) may instead be performed by the pico base station 200. It is understood, as a matter of course, that information required to perform the above operations are shared between the macro base station 100 and the pico base station 200.

(3) Modification 3

In the example of the first embodiment, a differentiation factor D(n) is calculated by multiplying Expression (3) by Expression (4); however, Expression (4), the ratio of communication data rates, can be the differentiation factor D(n) by itself.

(4) Modification 4

In the above embodiments, in the operations in the Cell Range Expansion, a received power value P is adjusted by adding a bias value 'a' to the received power value P; however, the received power value P may be adjusted by multiplying the received power value P by the bias value 'a' when the received power value P is expressed as a ratio. When the received power value P is expressed in decibels (dB, logarithm of the ratio), the received power value P may be adjusted by adding the bias value 'a' expressed in dB to the received power value P expressed in dB to calculate an adjusted received power value P. It is understood, as a matter of course, that the way mentioned immediately above is only one of the ways in which the received power value P is multiplied by the bias value 'a'.

(5) Modification 5

In the above embodiments, a pico base station 200 is used as an example of a base station that has a lower transmission capacity than a macro base station 100; however, a base station such as a micro base station, a nano base station, a femto base station, and a remote radio head may be used as a base station with a low transmission capacity. Moreover, for the components of the radio communication system 1, a combination of base stations with different transmission capacities (e.g., a combination of a macro base station, a pico base station, and a femto base station) may be used.

(6) Modification 6

A user terminal UE is a piece of freely chosen equipment capable of communicating wirelessly with each base station (a macro base station 100, a pico base station 200). The user terminal UE may be a mobile phone such as a feature phone or a smartphone, a desktop personal computer, a laptop personal computer, an ultra-mobile personal computer (UMPC), a portable game console, or any other type of wireless terminal.

(7) Modification 7

Functions executed by a CPU at each of the components (a macro base station 100, a pico base station 200, a user terminal UE) in the radio communication system 1 may be executed by a piece of hardware instead of by a CPU, or by a programmable logic device such as a field programmable gate array (FPGA) and a digital signal processor (DSP).

REFERENCE SYMBOLS

1: Radio Communication System
100: Macro Base Station
110: Radio Communication Unit
120: Base Station Communication Unit
130: Control Unit
142: Allocated Resource Group Determining Unit
144: Scheduling Unit
146: Downlink Control Signal Generating Unit
148: Downlink Data Signal Generating Unit
150: Bias Value Setting Unit
152: Bias Value Signaling Unit
154: Destination Selecting Unit
200: Pico Base Station
210: Radio Communication Unit
220: Base Station Communication Unit
230: Control Unit
242: Allocated Resource Group Determining Unit
244: Scheduling Unit
246: Downlink Control Signal Generating Unit
248: Downlink Data Signal Generating Unit
310: Radio Communication Unit
330: Control Unit
342: WCQI Measuring Unit
344: SCQI Measuring Unit
346: Data Demodulating Unit
348: Uplink Control Signal Generating Unit
350: Uplink Data Signal Generating Unit
352: Received Power Measuring Unit
354: Received Power Adjusting Unit
356: Received Power Signaling Unit
358: Connecting Unit
B: Number of Subframes
CQI: Channel Quality Index
Cm: Macrocell
Cp: Picocell
D(n) and d(n): Differentiation Factor
F: Radio Frame
NSF: Non-Protected Subframe
P (P1, P2, and P2a): Received Power Value
PSF: Protected Subframe
RB: Resource Block
SCQI: Subband Channel Quality Indicator
SF: Subframe
T: Connection Destination Cell Information
UE: User terminal
WCQI: Wideband Channel Quality Indicator
a: Bias Value
b(n): Allocated Amount of Resources
f: Objective Function
r(n): Communication Data Rate

The invention claimed is:
1. A radio communication system comprising:
a user terminal; and
a base station capable of communicating wirelessly with the user terminal by using at least one of radio resource groups, each of which contains radio resource units;

the user terminal comprising:
a first quality measuring unit adapted to measure the radio resource groups for their respective group radio qualities; and
a first quality reporting unit adapted to report the group radio qualities measured by the first quality measuring unit to the base station at a first frequence;
the base station comprising:
an allocated resource group determining unit adapted to determine at least one of the radio resource groups as an allocated radio resource group to be allocated for radio communication with the user terminal on a basis of the group radio qualities reported by the first quality reporting unit of the user terminal; and
an allocated resource group signaling unit adapted to report, to the user terminal, the at least one allocated radio resource group determined by the allocated resource group determining unit and to be allocated for radio communication with the base station;
the user terminal further comprising:
a second quality measuring unit adapted to measure a unit radio quality of at least one radio resource unit contained in the at least one allocated radio resource group reported by the allocated resource group signaling unit of the base station; and
a second quality reporting unit adapted to report the at least one unit radio quality measured by the second quality measuring unit to the base station at a second frequence, the second frequence being higher than the first frequence; and
the base station further comprising:
a scheduling unit adapted to schedule a radio resource to be allocated for radio communication between the base station and the user terminal on the basis of the at least one unit radio quality reported by the second quality reporting unit of the user terminal.

2. The radio communication system of claim 1, comprising the base stations,
wherein the base stations comprise a first base station and a second base station that has a lower radio transmission capacity than the first base station,
wherein the user terminal is capable of communicating wirelessly with either or both of the first base station and the second base station,
wherein the radio resource groups are protected resources and non-protected resources, the protected resources being the radio resource groups on which the second base station transmits radio signals and the non-protected resources being the radio resource groups on which both the first base station and the second base station transmit radio signals,
wherein the first quality measuring unit of the user terminal measures receiving qualities of all frequency bands of each of the protected resources and the non-protected resources as group radio qualities,
wherein the allocated resource group determining unit of the base station determines either or both of the protected resources and the non-protected resources as the allocated radio resource groups to be used for radio communication with the base station according to the receiving qualities of the protected resources and the receiving qualities of the non-protected resources, and
wherein the second quality measuring unit of the user terminal measures, as the unit radio qualities, the receiving quality of at least one partial frequency band contained in all frequency bands in either or both of the protected resources and the non-protected resources determined by the allocated resource group determining unit.

3. The radio communication system of claim 2, comprising the user terminals, wherein
the allocated resource group determining unit of the second base station determines, for each of the user terminals, either or both of the protected resources and the non-protected resources as the allocated radio resource groups to be used for radio communication between the second base station and each of the user terminals according to distribution of a differentiation factor calculated for each of the user terminals, the differentiation factor being calculated on the basis of the ratio of the receiving quality of the protected resource and the receiving quality of the non-protected resource, the receiving quality of the protected resource and the receiving quality of the non-protected resource having been reported by each of the user terminals wirelessly connected to the second base station.

4. The radio communication system of claim 3,
wherein the base station further comprises:
a bias value setting unit adapted to set a bias value for the user terminal;
a bias value signaling unit adapted to report the bias value to the user terminal; and
a destination selecting unit adapted to select a base station to which the user terminal is to connect wirelessly,
wherein the user terminal further comprises:
a received power measuring unit adapted to measure received power of radio signals received from the first base station to obtain a first received power value and to measure received power of radio signals received from the second base station to obtain a second received power value;
a received power adjusting unit adapted to adjust the second received power value upward by using the bias value reported by the bias value signaling unit of the base station; and
a received power signaling unit adapted to report the first received power value obtained by the received power measuring unit and the second received power value adjusted by the received power adjusting unit to the destination selecting unit of the base station,
wherein the destination selecting unit of the base station selects the base station corresponding to the received power value that is the greater of the first received power value and the adjusted second received power value reported by the received power signaling unit of the user terminal, and
wherein the allocated resource group determining unit of the second base station, among the user terminals wirelessly connected to the second base station, with respect to the user terminals for which the second received power values before adjustment with the bias values are higher than the first received power values, calculates the differentiation factors on the basis of the ratios of the receiving qualities of the protected resources and the receiving qualities of the non-protected resources reported by the user terminals, and with respect to the user terminals for which the second received power values before adjustment with the bias values are lower than the first received power values, sets a predetermined value as the differentiation factor.

5. A base station capable of communicating wirelessly with a user terminal by using at least one of radio resource groups, each of which contains radio resource units, comprising:

an allocated resource group determining unit adapted to determine at least one of the radio resource groups as an allocated radio resource group to be allocated for radio communication with the user terminal on the basis of group radio qualities that correspond to each of the radio resource groups and are reported by the user terminal at a first frequence;

an allocated resource group signaling unit adapted to report, to the user terminal, the at least one allocated radio resource group determined by the allocated resource group determining unit and to be allocated for radio communication with the base station; and a scheduling unit adapted to schedule a radio resource to be allocated for radio communication with the user terminal on the basis of at least one unit radio quality that corresponds to at least one radio resource unit contained in the at least one allocated radio resource group and is reported by the user terminal at a second frequence, the second frequence being higher than the first frequence.

6. A user terminal capable of communicating wirelessly with a base station by using at least one of radio resource groups, each of which contains radio resource units, comprising:

a first quality measuring unit adapted to measure the radio resource groups for their respective group radio qualities;

a first quality reporting unit adapted to report the group radio qualities measured by the first quality measuring unit to the base station at a first frequence;

a second quality measuring unit adapted to measure a unit radio quality of at least one radio resource unit contained in the at least one allocated radio resource group that has been determined on the basis of the group radio qualities and been reported to the user terminal by the base station and are to be allocated for radio communication with the base station;

a second quality reporting unit adapted to report the at least one unit radio quality measured by the second quality measuring unit to the base station at a second frequence, the second frequence being higher than the first frequence; and a data demodulating unit adapted to demodulate data signals transmitted by the base station according to radio resource scheduling that has been performed on the basis of the at least one unit radio quality.

7. A communication control method for a radio communication system, the radio communication system comprising:

a user terminal; and a base station capable of communicating wirelessly with the user terminal by using at least one of radio resource groups, each of which contains radio resource units;

the communication control method comprising:

in the user terminal, measuring the radio resource groups for their respective group radio qualities, and reporting the measured group radio qualities to the base station at a first frequence;

in the base station, determining at least one of the radio resource groups as an allocated radio resource group to be allocated for radio communication with the user terminal on the basis of the group radio qualities reported by the user terminal and reporting the at least one allocated radio resource group to be allocated for radio communication with the base station to the user terminal;

in the user terminal, measuring a unit radio quality of at least one radio resource unit contained in the at least one allocated radio resource group reported by the base station, and reporting the at least one measured unit radio quality to the base station at a second frequence, the second frequence being higher than the first frequence; and in the base station, scheduling a radio resource to be allocated for radio communication between the base station and the user terminal on the basis of the at least one unit radio quality reported by the user terminal.

* * * * *